(12) United States Patent
Noh et al.

(10) Patent No.: US 11,217,136 B2
(45) Date of Patent: Jan. 4, 2022

(54) DISPLAY DEVICE SUPPORTING A PARTIAL DRIVING MODE, AND METHOD OF OPERATING A DISPLAY DEVICE

(71) Applicant: SAMSUNG DISPLAY CO., LTD., Yongin-si (KR)

(72) Inventors: Jin Woo Noh, Hwaseong-si (KR); Geun Young Jeong, Busan (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/936,214

(22) Filed: Jul. 22, 2020

(65) Prior Publication Data
US 2021/0174716 A1  Jun. 10, 2021

(30) Foreign Application Priority Data
Dec. 9, 2019 (KR) ........................ 10-2019-0162823

(51) Int. Cl.
G09G 3/00 (2006.01)
(52) U.S. Cl.
CPC ....... *G09G 3/035* (2020.08); *G09G 2310/027* (2013.01); *G09G 2310/0267* (2013.01); *G09G 2320/045* (2013.01); *G09G 2380/02* (2013.01)
(58) Field of Classification Search
CPC ........... G09G 3/035; G09G 2310/0267; G09G 2310/027; G09G 2320/04; G09G 2380/02; G09G 3/3233; G09G 3/3208; G06F 1/1652; G09F 9/301; G02F 1/13336
See application file for complete search history.

(56) References Cited

U.S. PATENT DOCUMENTS

2005/0285811 A1* 12/2005 Kawase .............. G02F 1/13336
                                                            345/1.1
2015/0022561 A1*  1/2015 Ikeda ...................... G09F 9/301
                                                            345/690
2015/0233884 A1   9/2015 Hwang
2015/0255016 A1*  9/2015 An ........................ G09G 3/3233
                                                            345/211
(Continued)

FOREIGN PATENT DOCUMENTS

KR    10-2017-0065926    6/2017
KR    10-2018-0130071    12/2018

*Primary Examiner* — Richard J Hong
(74) *Attorney, Agent, or Firm* — F.Chau & Associates, LLC

(57) ABSTRACT

A foldable display device includes a display panel with a first display region, a second display region and a foldable display region located between the first and seconds display regions. A degradation information storage stores first degradation information for a first edge region and second degradation information for a second edge region. An edge information extractor extracts, in a first partial driving mode, first edge information for the first edge region from first partial image data, and extracts, in a second partial driving mode, second edge information for the second edge region from second partial image data. A gradation image generator generates, in the first partial driving mode, first gradation data based on the first edge information and the second degradation information, and generates, in the second partial driving mode, second gradation data based on the first degradation information and the second edge information.

19 Claims, 21 Drawing Sheets

(56) References Cited

U.S. PATENT DOCUMENTS

2016/0071457 A1* 3/2016 Kim .................... G09G 3/3233
                                                      345/690
2018/0018914 A1* 1/2018 Ikeda .................. G09G 3/3208
2018/0342192 A1* 11/2018 Lee ..................... G06F 1/1652

* cited by examiner

FIRST PARTIAL DRIVING MODE

SECOND PARTIAL DRIVING MODE

DISPLAY DEVICE SUPPORTING A PARTIAL DRIVING MODE, AND METHOD OF OPERATING A DISPLAY DEVICE

CROSS-REFERENCE TO RELATED APPLICATION(S)

This application claims priority under 35 USC § 119 from, and the benefit of, Korean Patent Application No. 10-2019-0162823, filed on Dec. 9, 2019 in the Korean Intellectual Property Office (KIPO), the contents of which are herein incorporated by reference in their entirety.

BACKGROUND

1. Technical Field

Exemplary embodiments are directed to a display device, and more particularly to a display device that supports a partial driving mode, and a method of operating the display device.

2. Discussion of the Related Art

Flexible display devices, such as a foldable display device that has at least a partially deformable display panel, have been recently developed. This flexible display device can be deformed such that a partial region of a display panel is viewable by a user, but the remaining region of the display panel is not viewable by the user In this case, to reduce power consumption, a flexible display device can operate in a partial driving mode which drives only the partial region of the display panel that is viewed by the user. However, in a flexible display device that supports a partial driving mode, display regions driven in the partial driving mode and not driven in the partial driving mode can have a degradation deviation, in which an image sticking phenomenon occurs between the driven display region and the non-driven display region.

SUMMARY

Some exemplary embodiments provide a display device that prevents or reduces an image sticking caused by a degradation deviation.

Some exemplary embodiments provide a method of operating a display device that prevents or reduces an image sticking caused by a degradation deviation.

According to exemplary embodiments, there is provided a display device that includes a display panel that includes a first display region, a second display region, and an intermediate display region located between the first display region and the second display region, a degradation information storage that stores first degradation information for a first edge region within the first display region that is adjacent to the intermediate display region, and second degradation information for a second edge region within the second display region that is adjacent to the intermediate display region, an edge information extractor that extracts, in a first partial driving mode in which the first display region is driven, first edge information for the first edge region from first partial image data for the first display region, and that extracts, in a second partial driving mode in which the second display region is driven, second edge information for the second edge region from second partial image data for the second display region, and a gradation image generator that generates, in the first partial driving mode, first gradation data for the intermediate display region based on the first edge information and the second degradation information, and that generates, in the second partial driving mode, second gradation data for the intermediate display region based on the first degradation information and the second edge information.

In exemplary embodiments, the display panel is an out-foldable display panel, and the intermediate display region is a foldable region of the out-foldable display panel.

In exemplary embodiments, the display device operates in the first partial driving mode when the out-foldable display panel is folded such that the first display region is located at a front side and the second display region is located at a back side, and the display device operates in the second partial driving mode when the out-foldable display panel is folded such that the second display region is located at the front side and the first display region is located at the back side.

In exemplary embodiments, the gradation image generator generates the first gradation data such that the first gradation data continuously change from a gray value represented by the first edge information to a gray value represented by the second degradation information along a first direction from the first display region to the second display region. The gradation image generator generates the second gradation data such that the second gradation data continuously change from a gray value represented by the first degradation information to a gray value represented by the second edge information along the first direction.

In exemplary embodiments, the gradation image generator calculates a first edge block gray value by calculating an average of N consecutive gray values represented by the first edge information, where N is an integer greater than 1, calculates a second degradation block gray value by calculating an average of N consecutive gray values represented by the second degradation information, and generates the first gradation data such that the first gradation data continuously change from the first edge block gray value to the second degradation block gray value along a first direction from the first display region to the second display region. The gradation image generator calculates a first degradation block gray value by calculating an average of N consecutive gray values represented by the first degradation information, calculates a second edge block gray value by calculating an average of N consecutive gray values represented by the second edge information, and generates the second gradation data such that the second gradation data continuously change from the first degradation block gray value to the second edge block gray value along the first direction.

In exemplary embodiments, the gradation image generator calculates a first edge weighted moving average by calculating a weighted moving average of N consecutive gray values represented by the first edge information, where N is an integer greater than 1, calculates a second degradation weighted moving average by calculating a weighted moving average of N consecutive gray values represented by the second degradation information, and generates the first gradation data such that the first gradation data continuously change from the first edge weighted moving average to the second degradation weighted moving average along a first direction from the first display region to the second display region. The gradation image generator calculates a first degradation weighted moving average by calculating a weighted moving average of N consecutive gray values represented by the first degradation information, calculates a second edge weighted moving average by calculating a weighted moving average of N consecutive gray values represented by the second edge information, and generates the second gradation data such that the second gradation data continuously change from the first degradation weighted moving average to the second edge weighted moving average along the first direction.

In exemplary embodiments, the first edge region includes first M pixel lines, where M is an integer greater than 0, and the second edge region includes second M pixel lines. The edge information extractor generates the first edge information by calculating an average of M gray levels represented by the first partial image data for the first M pixel lines, and generates the second edge information by calculating an average of M gray levels represented by the second partial image data for the second M pixel lines.

In exemplary embodiments, the first edge region includes first M pixel lines, where M is an integer greater than 0, and the second edge region includes second M pixel lines. The edge information extractor generates the first edge information by extracting a maximum of M gray levels represented by the first partial image data for the first M pixel lines, and generates the second edge information by extracting a maximum of M gray levels represented by the second partial image data for the second M pixel lines.

In exemplary embodiments, the first edge region includes first M pixel lines, w here M is an integer greater than 0, and the second edge region includes second M pixel lines. The edge information extractor generates the first edge information by calculating a weighted average of M gray levels represented by the first partial image data for the first M pixel lines with a weight that decreases as a distance from the intermediate display region increases, and generates the second edge information by calculating a weighted average of M gray levels represented by the second partial image data for the second M pixel lines with a weight that decreases as a distance from the intermediate display region increases.

In exemplary embodiments, the first degradation information is updated every L frames by calculating an average of accumulated gray values represented by the first degradation information and current gray values represented by current image data for the first edge region, where L is an integer greater than 0, and the second degradation information is updated every L frames by calculating an average of accumulated gray values represented by the second degradation information and current gray values represented by current image data for the second edge region.

In exemplary embodiments, each of the first degradation information and the second degradation information includes K accumulated gray values, where K is an integer greater than 0, and one of the K accumulated gray values of each of the first degradation information and the second degradation information is updated every L frames, where L is an integer greater than 0.

In exemplary embodiments, each pixel of the display panel includes a red sub-pixel, a green sub-pixel and a blue sub-pixel. The gradation image generator generate, in the first partial driving mode, the first gradation data with respect to each of the red sub-pixel, the green sub-pixel and the blue sub-pixel, and generates, in the second partial driving mode, the second gradation data with respect to each of the red sub-pixel, the green sub-pixel and the blue sub-pixel.

In exemplary embodiments, each pixel of the display panel includes a red sub-pixel, a green sub-pixel and a blue sub-pixel. The gradation image generator generates, in the first partial driving mode, the first gradation data that represents a first same gray value with respect to each of the red sub-pixel, the green sub-pixel and the blue sub-pixel in a same pixel, and generates, in the second partial driving mode, the second gradation data that represents a second same gray value with respect to each of the red sub-pixel, the green sub-pixel and the blue sub-pixel in the same pixel.

In exemplary embodiments, the display device further includes a scan driver that includes first stages that sequentially transmit first scan signals to the first display region in response to a first scan start signal, second stages that sequentially transmit second scan signals to the intermediate display region in response to a second scan start signal, and third stages that sequentially transmit third scan signals to the second display region in response to a third scan start signal.

In exemplary embodiments, the display device further includes a data driver that transmits data signals to the display panel. In the first partial driving mode, the data driver transmits the data signals that correspond to the first partial image data to the first display region and the data signals that correspond to the first gradation data to the intermediate display region such that an image that corresponds to the first partial image data is displayed in the first display region and a first gradation image that corresponds to the first gradation data is displayed in the intermediate display region. In the second partial driving mode, the data driver transmits the data signals that correspond to the second partial image data to the second display region and the data signals that correspond to the second gradation data to the intermediate display region such that an image that corresponds to the second partial image data is displayed in the second display region and a second gradation image that corresponds to the second gradation data is displayed in the intermediate display region.

In exemplary embodiments, in a third partial driving mode in which the first display region and the second display region are driven, the gradation image generator generates third gradation data for the intermediate display region based on the first edge information and the second edge information.

According to exemplary embodiments, there is provided a method of operating a display device that includes a display panel that includes a first display region, a second display region, and an intermediate display region located between the first display region and the second display region. The method includes storing first degradation information for a first edge region within the first display region that is adjacent to the intermediate display region, storing second degradation information for a second edge region within the second display region that is adjacent to the intermediate display region, extracting first edge information for the first edge region from first partial image data for the first display region in a first partial driving mode in which the first display region is driven, extracting second edge information for the second edge region from second partial image data for the second display region in a second partial driving mode in which the second display region is driven, generating, in the first partial driving mode, first gradation data for the intermediate display region based on the first edge information and the second degradation information, generating, in the second partial driving mode, second gradation data for the intermediate display region based on the first degradation information and the second edge information, driving, in the first partial driving mode, the first display region and the intermediate display region based on the first partial image data and the first gradation data, and driving, in the second partial driving mode, the second display region and the intermediate display region based on the second partial image data and the second gradation data.

In exemplary embodiments, the first gradation data is generated such that the first gradation data continuously change from a gray value represented by the first edge information to a gray value represented by the second degradation information along a first direction from the first display region to the second display region, and the second gradation data is generated such that the second gradation data continuously change from a gray value represented by the first degradation information to a gray value represented by the second edge information along the first direction.

In exemplary embodiments, a first edge block gray value is calculated by calculating an average of N consecutive gray values represented by the first edge information, where N is an integer greater than 1, a second degradation block gray value is calculated by calculating an average of N consecutive gray values represented by the second degradation information, and the first gradation data is generated such that the first gradation data continuously change from the first edge block gray value to the second degradation block gray value along a first direction from the first display region to the second display region. A first degradation block gray value is calculated by calculating an average of N consecutive gray values represented by the first degradation information, a second edge block gray value is calculated by calculating an average of N consecutive gray values represented by the second edge information, and the second gradation data is generated such that the second gradation data continuously change from the first degradation block gray value to the second edge block gray value along the first direction.

In exemplary embodiments, a first edge weighted moving average is calculated by calculating a weighted moving average of N consecutive gray values represented by the first edge information, where N is an integer greater than 1, a second degradation weighted moving average is calculated by calculating a weighted moving average of N consecutive gray values represented by the second degradation information, and the first gradation data is generated such that the first gradation data continuously change from the first edge weighted moving average to the second degradation weighted moving average along a first direction from the first display region to the second display region. A first degradation weighted moving average is calculated by calculating a weighted moving average of N consecutive gray values represented by the first degradation information, a second edge weighted moving average is calculated by calculating a weighted moving average of N consecutive gray values represented by the second edge information, and the second gradation data is generated such that the second gradation data continuously change from the first degradation weighted moving average to the second edge weighted moving average along the first direction.

As described above, in a display device and a method of operating the display device according to exemplary embodiments, first degradation information for a first edge region of a first display region and second degradation information for a second edge region of a second display region are stored, first gradation data for an intermediate display region is generated in a first partial driving mode based on first edge information for the first edge region and the second degradation information for the second edge region, and second gradation data for the intermediate display region is generated in a second partial driving mode based on the first degradation information for the first edge region and second edge information for the second edge region. Accordingly, image sticking is not perceived between the first edge region and the intermediate display region, and between the intermediate display region and the second edge region.

DETAILED DESCRIPTION OF EXEMPLARY EMBODIMENTS

Hereinafter, exemplary embodiments of the present inventive concept will be explained in detail with reference to the accompanying drawings.

Figure 1:
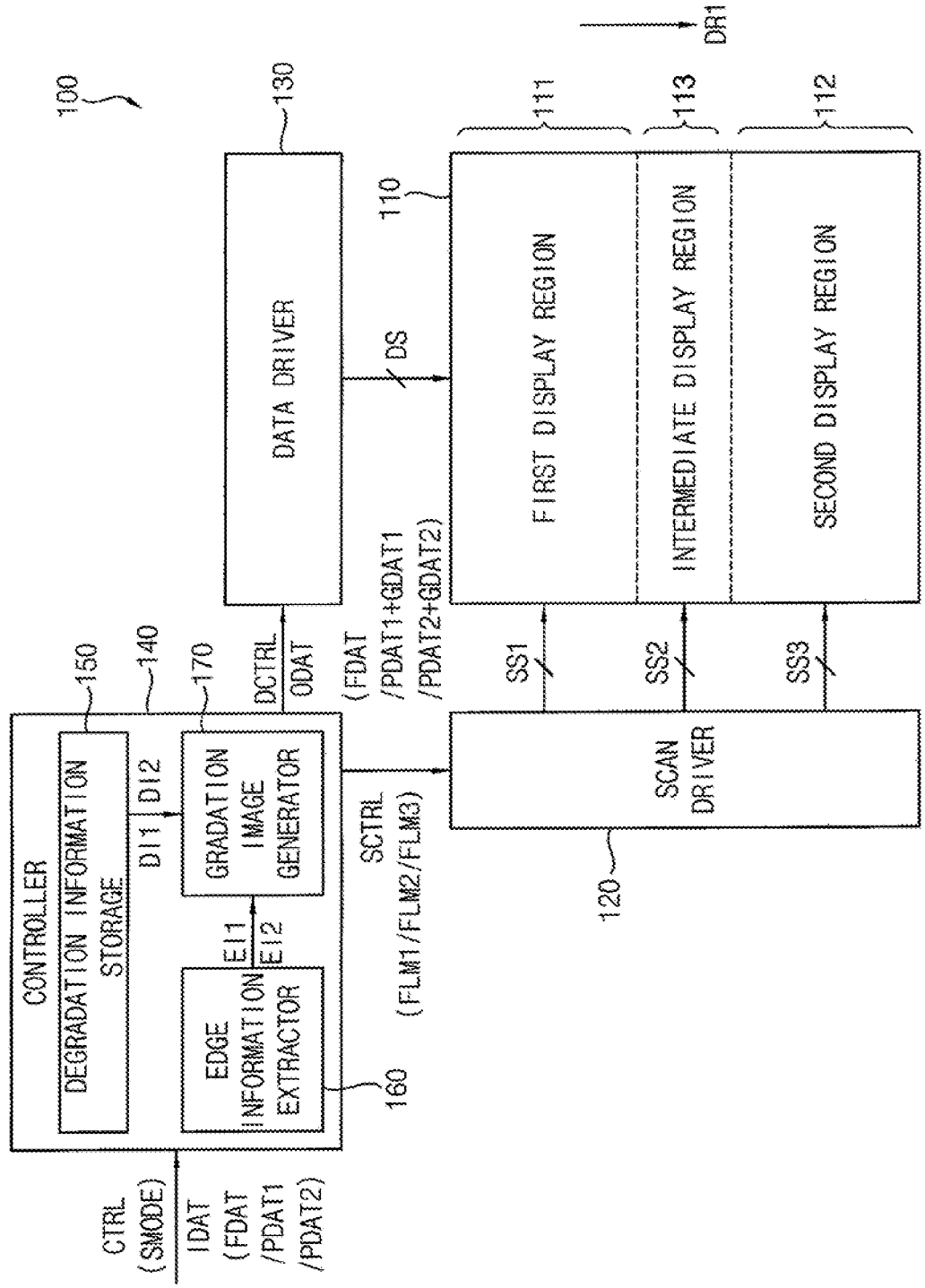
FIG. 1 is a block diagram of a display device according to exemplary embodiments.
Figure 2:
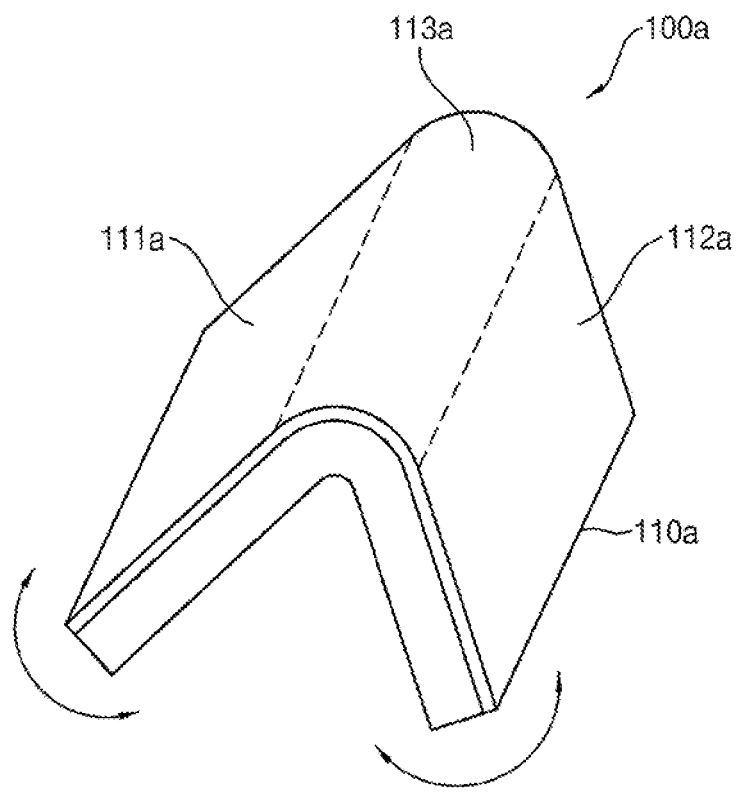
FIG. 2 illustrates an example of an out-foldable display device according to exemplary embodiments.
Figure 3A:
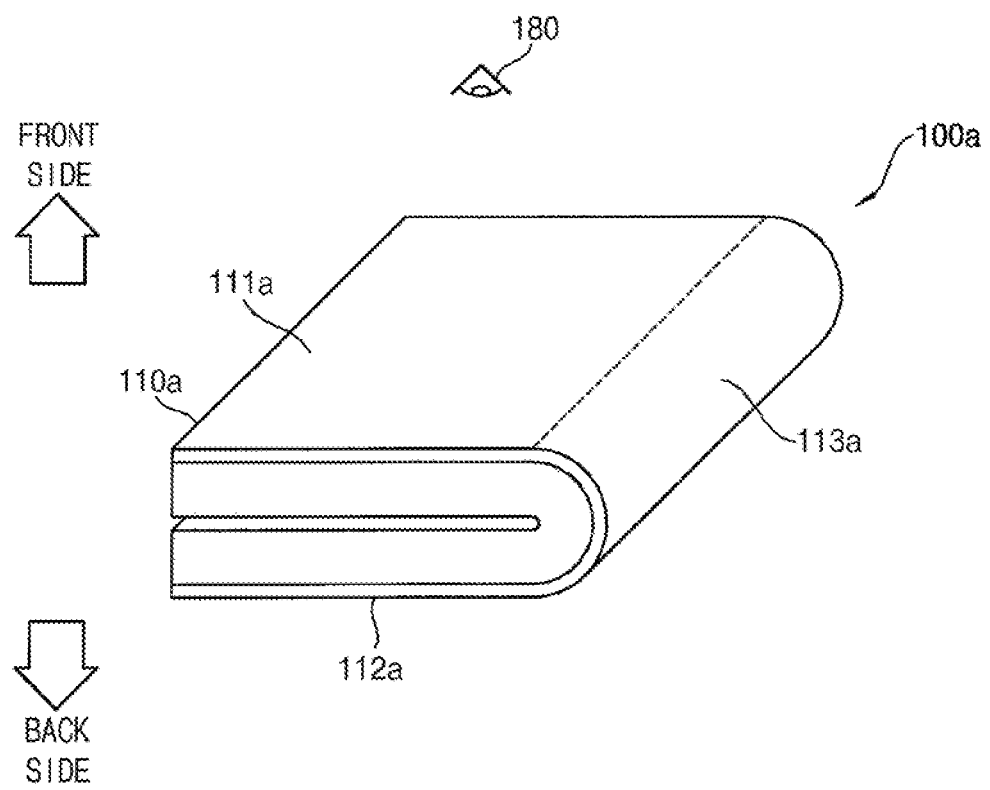
FIG. 3A illustrates an operation of a display device in a first partial driving mode according to exemplary embodiments.
Figure 3B:
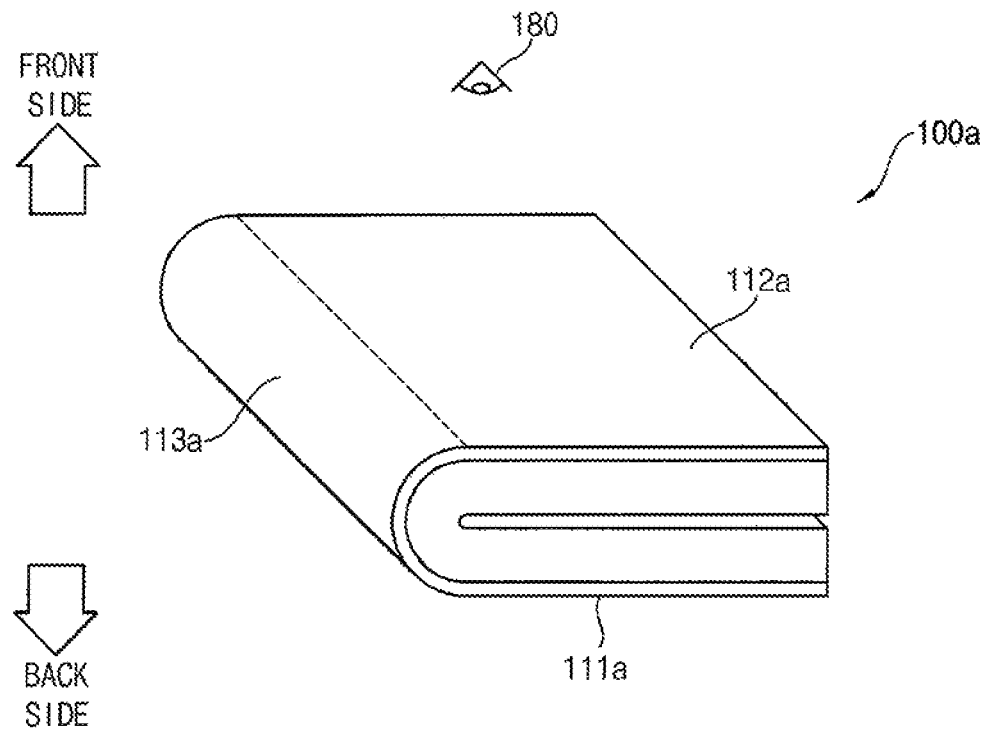
FIG. 3B illustrates an operation of a display device in a second partial driving mode according to exemplary embodiments.
Figure 3C:
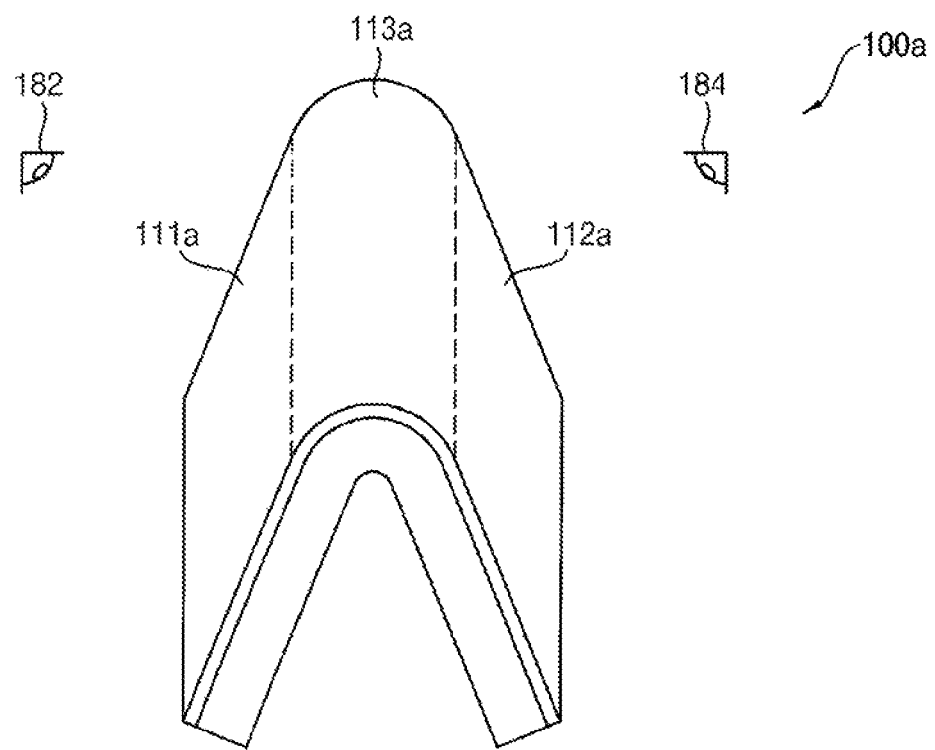
FIG. 3C illustrates an operation of a display device in a third partial driving mode according to exemplary embodiments.
Figure 4:
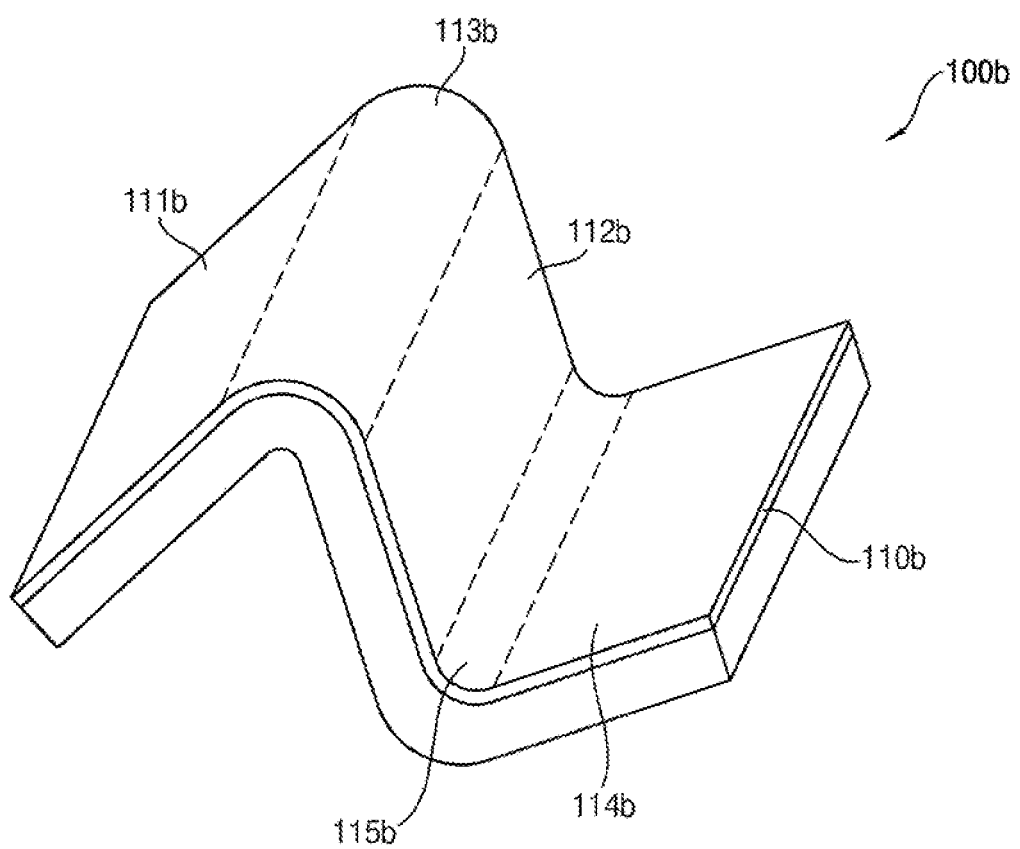
FIG. 4 illustrates an example of a foldable display device having two or more foldable regions.
Figure 5:
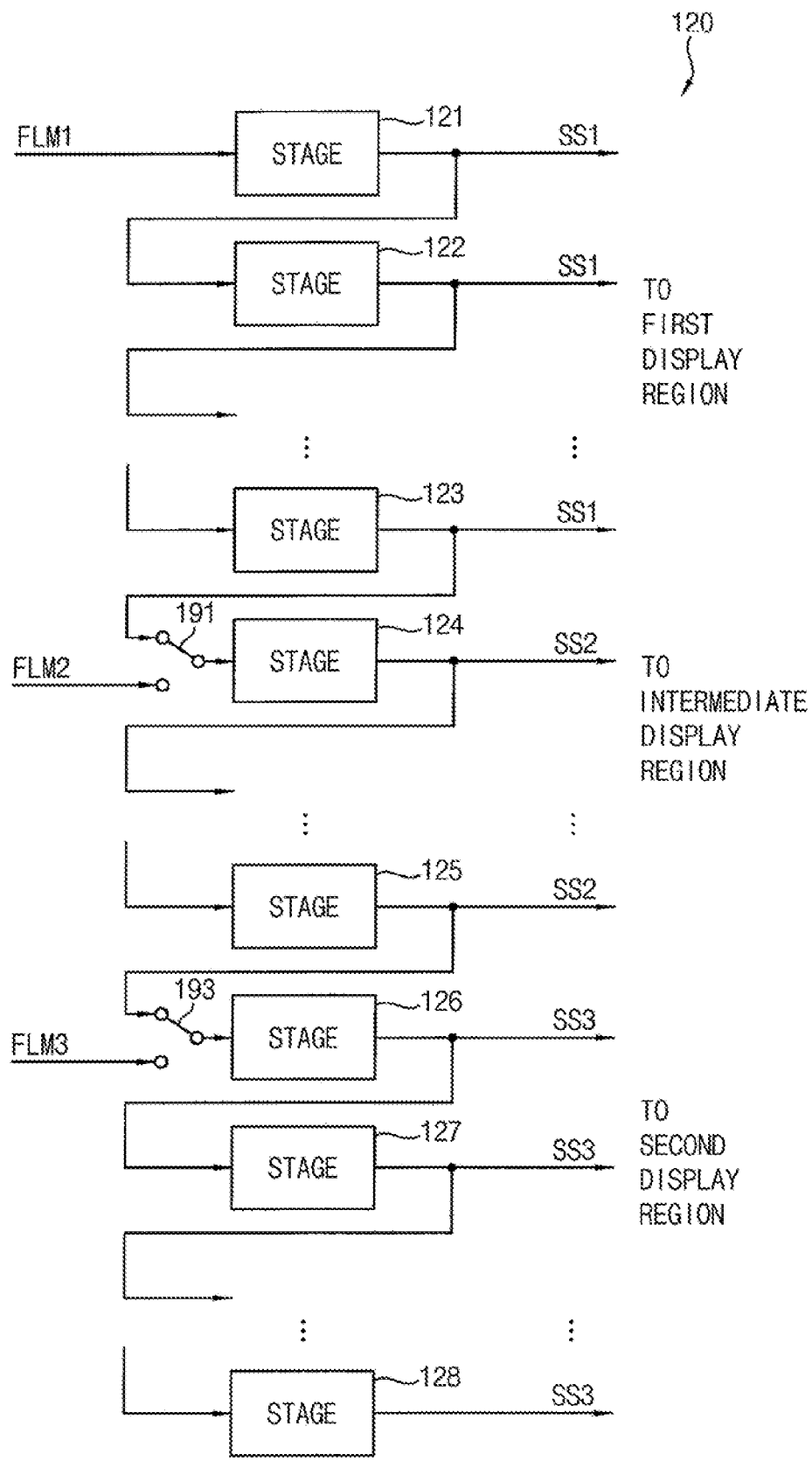
FIG. 5 is a block diagram of an example of a scan driver included in a display device according to exemplary embodiments.
Figure 6A:
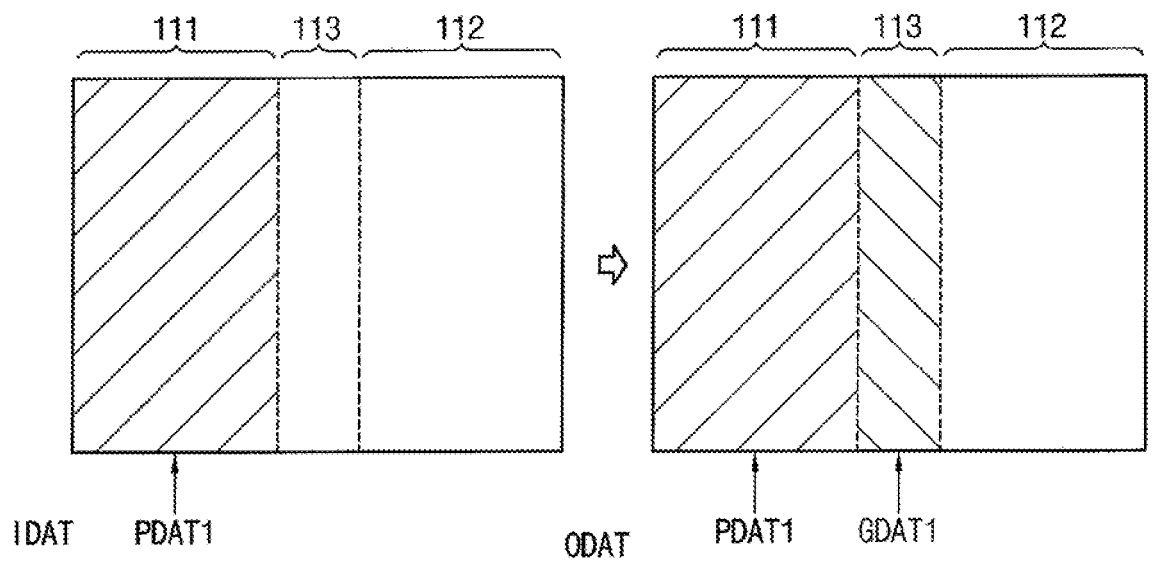
FIG. 6A illustrates an example of first gradation data generated in a first partial driving mode.
Figure 6B:
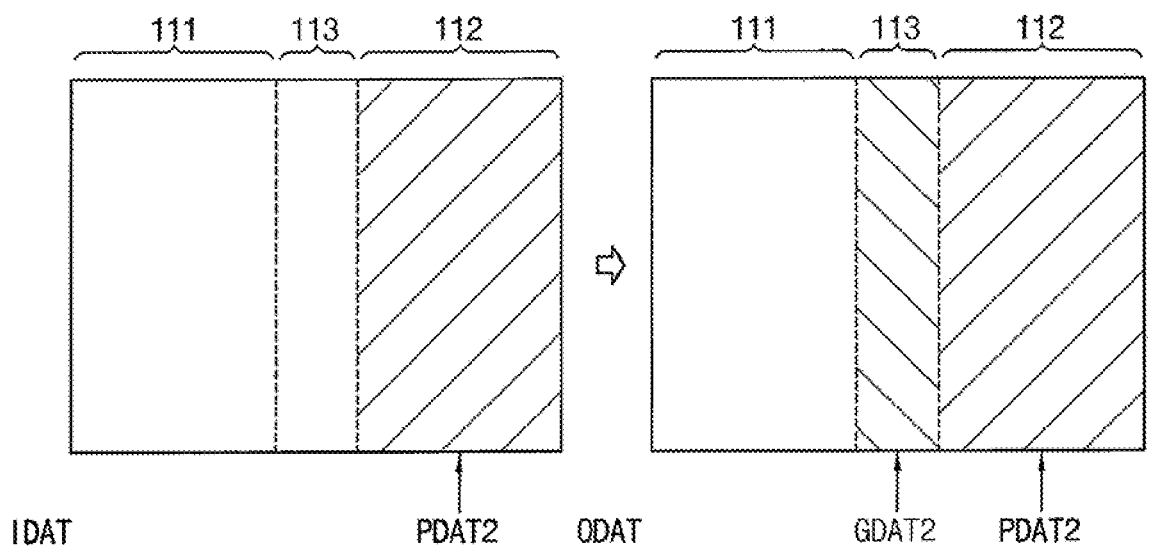
FIG. 6B illustrates an example of second gradation data generated in a second partial driving mode.
Figure 7:
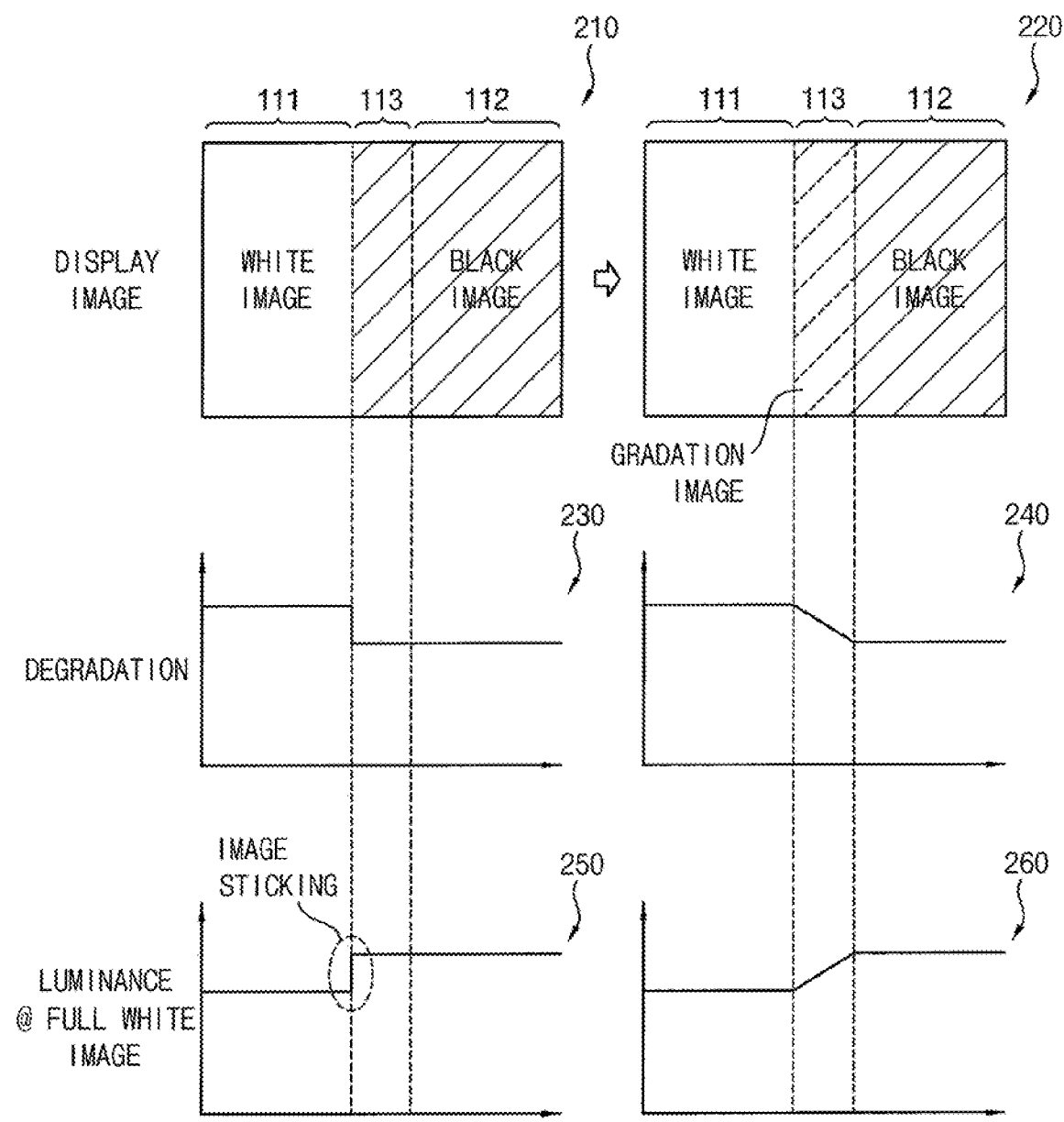
FIG. 7 illustrates luminance of a display device that does not generate gradation data and luminance of a display device that generates gradation data according to exemplary embodiments.

FIG. 1 is a block diagram of a display device according to exemplary embodiments, FIG. 2 illustrates an example of an out-foldable display device according to exemplary embodiments. FIG. 3A illustrates an operation of a display device in a first partial driving mode according to exemplary embodiments, FIG. 3B illustrates an operation of a display device in a second partial driving mode according to exemplary embodiments, FIG. 3C illustrates an operation of a display device in a third partial driving mode according to exemplary embodiments, FIG. 4 illustrates an example of a foldable display device having two or more foldable regions, FIG. 5 is a block diagram of an example of a scan driver included in a display device according to exemplary embodiments, FIG. 6A illustrates an example of first gradation data generated in a first partial driving mode, FIG. 6B illustrates an example of second gradation data generated in a second partial driving mode, and FIG. 7 illustrates luminance of a display device that does not generate gradation data and luminance at a display device that generates gradation data according to exemplary embodiments.

Referring to FIG. 1, a display device 100 according to exemplary embodiments include a display panel 110 that includes a plurality of pixels, a scan driver 120 that provides scan signals SS1, SS2 and SS3 to the plurality of pixels, a data driver 130 that provides data signals DS to the plurality of pixels, and a controller 140 that controls the scan driver 120 and the data driver 130.

According to embodiments, the display panel 110 includes a plurality of data lines, a plurality of scan lines, and the plurality of pixels are coupled to the plurality of data lines and the plurality of scan lines. In some exemplary embodiments, each pixel includes at least one capacitor, at least two transistors and an organic light emitting diode (OLED), and the display panel 110 is an OLED display panel. In other exemplary embodiments, the display panel 110 is a liquid crystal display (LCD) panel, or any other suitable display panel.

According to embodiments, as illustrated in FIG. 1, the display panel 110 includes a first display region 111, a second display region 112, and an intermediate or boundary display region 113 between the first display region 111 and the second display region 112. The first display region 111, rite intermediate display region 113 and the second display region 112 are continuously formed. In some exemplary embodiments, as illustrated in FIG. 2, the display panel 110 is an out-foldable display panel 110a of an out-foldable display device 100a, and the intermediate display region 113 is a foldable region 113a of the out-foldable display panel 110a in which the out-foldable display panel 110a is folded. Further, for example, the first and second display regions 111 and 112 may be, but are not limited to, first and second flat display regions 111a and 112a of the out-foldable display panel 110a.

In some exemplary embodiments, as illustrated in FIG. 3A, when the out-foldable display panel 110a is folded such that the first (flat) display region 111a is located at a front side and the second (flat) display region 112a is located at a back side, the out-foldable display device 100a operates in a first partial driving mode in which the first display region 111a is driven and the second display region 112a is not driven. Here, the front side is a top side, or a side that is viewable by a user 180. Further, the back side may be a bottom side, or a side that is not viewed by the user 180. The second display region 112a located at the back side which is not viewable by the user 180 is not driven, and thus power consumption of the out-foldable display panel 110a is reduced. Further, as illustrated in FIG. 3B, when the out-foldable display panel 110a is folded such that the second display region 112a is located at the front side and the first display region 111a is located at the back side, the out-foldable display device 100a operates in a second partial driving mode in which the first display region 111a is not driven and the second display region 112a is driven.

In some exemplary embodiments, in addition to the first and second partial driving modes, a partial driving mode of the out-foldable display device 100a further includes a third partial driving mode in which the first and second display regions 111a and 112a are driven to display different images. For example, as illustrated in FIG. 3C, an image in the first display region 111a is displayed to a first user 182, and an image in the second display region 112a is displayed to a second user 184.

In other exemplary embodiments, as illustrated in FIG. 4, the display panel 110 is a foldable display panel 110b of a foldable display device 100b that includes two or more foldable regions 113b and 115b. The foldable display device 100b includes first, second and third (flat) display regions 111b, 112b and 114b and first and second intermediate display regions 113b and 115b, or first and second foldable regions 113b and 115b. Although FIGS. 2 through 4 illustrate examples where the display device 100 is the foldable display devices 100a and 100b, in some exemplary embodiments, the display device 100 is any flexible display device, such as a curved display device, a bent display device, a rollable display device, or a stretchable display device, etc. In other exemplary embodiments, the display device 100 is a flat, e.g., rigid, display device.

According to embodiments, the scan driver 120 provides the scan signals SS1, SS2 and SS3 to the plurality of pixels through the plurality of scan lines based on a scan control signal SCTRL received from the controller 140. In some exemplary embodiments, the scan driver 120 sequentially provides the scan signals SS1, SS2 and SS3 to the plurality of pixels on a row-by-row basis. In some exemplary embodiments, the scan control signal SCTRL includes, but is not limited to, one or more scan start signals FLM1, FLM2 and FLM3 and one or more scan clock signals. In some exemplary embodiments, the scan driver 120 is integrated into or formed in a peripheral portion of the display panel 110. In other exemplary embodiments, the scan driver 120 is implemented with one or more integrated circuits.

In some exemplary embodiments, the scan driver 120 receives first, second and third scan start signals FLM1, FLM2 and FLM3 from the controller 140, and transmits first scan signals SS1 to the first display region 111 in response to the first scan start signal FLM1, transmits second scan signals SS2 to the intermediate display region 113 in response to the second scan start signal FLM2, and transmits third scan signals SS3 to the second display region 112 in response to the third scan start signal FLM3. For example, as illustrated in FIG. 5, the scan driver 120 includes first stages 121, 122, . . . , 123 that sequentially transmit the first scan signals SS1 to the first display region 111 in response to the first scan start signal FLM1, second stages 124, . . . , 125 that sequentially transmit the second scan signals SS2 to the intermediate display region 113 in response to the second scan start signal FLM2, and third stages 126, 127, ..., 128 that sequentially transmit the third scan signals SS3 to the second display region 112 in response to the third scan start signal FLM3.

In some exemplary embodiments, as illustrated in FIG. 5, the scan driver 120 further includes a first switch 191 that selectively couples a last one 123 of the first stages 121, 122, ..., 123 and a first one 124 of the second stages 124, ..., 125, and a second switch 193 that selectively couples a last one 125 of the second stages 124, 125 and a first one 126 of the third stages 126, 127, ..., 128. The first switch 191 selectively transmits the second scan start signal FLM2 or the first scan signal SS1 (or a carry signal) of the last one 123 of the first stages 121, 122, ..., 123 to the first one 124 of the second stages 124, ... 125, and the second switch 193 selectively transmits the third scan start signal FLM3 or the second scan signal SS2 (or a carry signal) of the last one 125 of the second stages 124 ... 125 to the first one 126 of the third stages 126, 127, ..., 128. For example, in a normal driving mode, or an entire driving mode, the first switch 191 transmits the first scan signal SS1 of the last of the first stages 123 to the first of the second stages 124, and the second switch 193 transmits the second scan signal SS2 of the last of the second stages 125 to the first of the third stages 126. In another example, when one of the first display region 111 and the intermediate display region 113 is driven, and the other is not driven, the second scan start signal FLM2 has an on-level or an off-level, and the first switch 191 transmits the second scan start signal FLM2 to the first one 124 of the second stages. Further, when one of the intermediate display region 113 and the second display region 112 is driven, and the other is not driven, the third scan start signal FLM3 has an on-level or an off-level, the second switch 193 transmits the third scan start signal FLM3 to the first one 126 of the third stages.

According to embodiments, the data driver 130 generates the data signals DS based on output image data ODAT and a data control signal DCTRL received from the controller 140 and transmits the data signals DS to the plurality of pixels through the plurality of data lines. In some exemplary embodiments, the data control signal DCTRL includes, but is not limited to an output data enable signal, a horizontal start signal and a load signal. In some exemplary embodiments, the data driver 130 and the controller 140 are implemented with a single integrated circuit, and the integrated circuit is referred to as a liming controller embedded data driver (TED). In other exemplary embodiments, the data driver 130 and the controller 140 are implemented with separate integrated circuits.

According to embodiments, the controller 140, such as a timing controller), receives input image data IDAT and a control signal CTRL from an external host processor, such as a graphic processing unit (GPU) or a graphics card. The control signal CTRL includes a mode signal SMODE that indicates a driving mode of the display device 100. For example, the mode signal SMODE indicates one of the normal driving mode, in which each of the first display region 111, the intermediate display region 113 and the second display region 112 is driven, the first partial driving mode, in which the first display region 111 is driven, or the second partial driving mode, in which the second display region 112 is driven. For example, the mode signal SMODE indicates the first partial driving mode when the first display region 111 is located at the front side as illustrated in FIG. 3A, and indicates the second partial driving mode when the second display region 112 is located at the front side as illustrated in FIG. 3B. In some exemplary embodiments, when the first and second display regions 111 and 112 display different images to different users, as illustrated in FIG. 3C, the mode signal SMODE, further indicates the third partial driving mode, in which both of the first and second display regions 111 and 112 are driven. In some exemplary embodiments, the control signal CTRL further includes, but is not limited to, a vertical synchronization signal, a horizontal synchronization signal, an input data enable signal, a master clock signal, etc. The controller 140 generates the output image data ODAT, the data control signal DCTRL and the scan control signal SCTRL based on the input image data IDAT and the control signal CTRL. The controller 140 controls an operation of the scan driver 120 by providing the scan control signal SCTRL to the scan driver 120, and controls an operation of the data driver 130 by providing the output image data ODAT and the data control signal DCTRL to the data driver 130.

According to embodiments, in a normal driving mode, the controller 140 receives, as the input image data IDAT, frame data FDAT for the entire display regions 111, 112 and 113 of the display panel 110. In some exemplary embodiments, the controller 140 receives, as the input image data IDAT, the first partial image data PDAT1 for the first display region 111 in the first partial driving mode, and receives, as the input image data IDAT, the second partial image data PDAT2 for the second display region 112 in the second partial driving mode. In other exemplary embodiments, the controller 140 receives, as the input image data IDAT in the first partial driving mode, the first partial image data PDAT1 for the first display region 111 and black data for the intermediate display region 113 and the second display region 112, and receives, as the input image data IDAT in the second partial driving mode, the second partial image data PDAT2 for the second display region 112 and black data for the first display region 111 and the intermediate display region 113. Further, in some exemplary embodiments, the controller 140 receives, as the input image data IDAT in the third partial driving mode, the first and second partial image data PDAT1 and PDAT2 for the first and second display regions 111 and 112.

The controller 140 of the display device 100 according to exemplary embodiments generates, in the first partial driving mode in which the first display region 111 is driven, first gradation data GDAT1 for the intermediate display region 113 based on first edge information EI1 for a first edge region of the first display region 111, and second degradation information DI2 for a second edge region of the second display region 112, and generates, in the second partial driving mode in which the second display region 112 is driven, second gradation data GDAT2 for the intermediate display region 113 based on first degradation information DI1 for the first edge region of the first display region 111 and second edge information EI2 for the second edge region of the second display region 112. In some exemplary embodiments, the controller 140 generates, in the third partial driving mode in which the first and second display regions 111 and 112 are driven, third gradation data for the intermediate display region 113 based on the first edge information EI1 for the first edge region of the first display region 111 and the second edge information EI2 for the second edge region of the second display region 112. To perform these operations, the controller 140 includes a degradation information storage 150, an edge information extractor 160 and a gradation image generator 170.

According to embodiments, the degradation information storage 150 stores the first degradation information DI1 for the first edge region within the first display region 111 that is adjacent to the intermediate display region 113, and the second degradation information DI2 for the second edge region within the second display region 112 that is adjacent to the intermediate display region 113. According to exemplary embodiments, each of the first and second edge regions may include one pixel line coupled to one scan line (or one data line), a few pixel lines, or tens of pixel lines. Here, one pixel line may mean one line (e.g., one tow) of pixels coupled to the same scan line, or one line (e.g., one column) of pixels coupled to the same data line. The degradation information DI1 represents an accumulated driving voltage for the first edge region, and the second degradation information DI2 represents an accumulated driving voltage for the second edge region. In some exemplary embodiments, the first and second degradation information DI1 and DI2 is updated for each frame. In other exemplary embodiments, the first and second degradation information DI1 and DI2 is updated every L frames, where L is an integer greater than 0. In still other exemplary embodiments, accumulated gray values of each of the first and second degradation information DI1 and DI2 are sequentially selected every L frames, and a selected accumulated gray value is updated every L frames. For example, when each of the first and second degradation information DI1 and DI2 includes K accumulated gray values, where K is an integer greater than 1, the entirety of each of the first and second degradation information DI1 and DI2 is updated every L×K frames. In some exemplary embodiments, the degradation information storage 150 is a nonvolatile memory device, such as a flash memory device.

According to embodiments, in the first partial driving mode, the edge information extractor 160 receives the first partial image data PDAT1 for the first display region 111, and extracts the first edge information EI1 for the first edge region from the first partial image data PDAT1. In the second partial driving mode, the edge information extractor 160 receives the second partial image data PDAT2 for the second display region 112, and extracts the second edge information EI2 for the second edge region from second partial image data PDAT2. Here, the first edge information EH includes gray values for the first edge region in a current frame, and the second edge information EI2 includes gray values for the second edge region in the current frame In some exemplary embodiments, each of the first and second edge regions includes M pixel lines (e.g., M rows of pixels coupled to M scan lines or M columns of pixels coupled to M data lines), where M is an integer greater than 0, and the edge information extractor 160 generates the first edge information EI1 or the second edge information EI2 for each row, i.e., corresponding to each data line or each scan line, by calculating an average of M input gray levels for the M pixel lines. In other exemplary embodiments, the edge information extractor 160 generates the first edge information EI1 or the second edge information EI2 for each row by extracting a maximum value of the M gray levels for the M pixel lines. In still other exemplary embodiments, the edge information extractor 160 generates the first edge information EI1 or the second edge information EI2 of each row by calculating a weighted average of the M gray levels for the M pixel lines with a weight that gradually or continuously decreases as a distance of each row from the intermediate display region 113 increases.

According to embodiments, in the first partial driving mode in which the first display region 111 is driven, the gradation image generator 170 generates the first gradation data GDAT1 for the intermediate display region 113 based on the first edge information EI1 of the first edge region of the first display region 111 and the second degradation information DI2 of the second edge region of the second display region 112. In some exemplary embodiments, the first gradation data GDAT1 gradually or continuously change from a gray value represented by the first edge information EI1 to a gray value represented by the second degradation information DI2 along a first direction DR1 from the first display region 111 to the second display region 112 with respect to each row. In other exemplary embodiments, the first gradation data GDAT1 gradually or continuously change from the gray value represented by the first edge information EI1 to the gray value represented by the second degradation information DI2 along the first direction DR1 on a block-by-block basis where each block includes two or more rows. In still other exemplary embodiments, the first gradation data GDAT1 gradually or continuously change from a weighted moving average of the first edge information EI1 to a weighted moving average of the second degradation information DI2 along the first direction DR1. In the first partial driving mode, the controller 140 provides to the data driver 130, as the output image data ODAT, the first partial image data PDAT1 for the first display region 111 and the first gradation data GDAT1 for the intermediate display region 113. In the first partial driving mode, the data driver 130 provides the data signals DS that correspond to the first partial image data PDAT1 to the first display region 111, and provides the data signals DS that correspond to the first gradation data GDAT1 to the intermediate display region 113. Thus, as illustrated in FIG. 6A, in the first partial driving mode, even if the controller 140 receives, as the input image data IDAT, only the first partial image data PDAT1 for the first display region 111, the controller 140 outputs, as the output image data ODAT, the first partial image data PDAT1 for the first display region 111 and the first gradation data GDAT1 for the intermediate display region 113. Accordingly, an image that corresponds to the first partial image data PDAT1 can be displayed in the first display region 111, and a first gradation image that corresponds to the first gradation data GDAT1 can be displayed in the intermediate display region 113.

According to embodiments, in the second partial driving mode in which the second display region 112 is driven, the gradation image generator 170 generates the second gradation data GDAT2 for the intermediate display region 113 based on the first degradation information DI1 of the first edge region of the first display region 111 and the second edge information EI2 of the second edge region of the second display region 112. In some exemplary embodiments, the second gradation data GDAT2 gradually or continuously change from a gray value represented by the first degradation information DI1 to a gray value represented by the second edge information HI2 along the first direction DR1 with respect to each pixel row. In other exemplary embodiments, the second gradation data GDAT2 gradually or continuously change from the gray value represented by the first degradation information DI1 to the gray value represented by the second edge information EI2 along the first direction DR1 on a block-by-block basis. In still other exemplary embodiments, the second gradation data GDAT2 gradually or continuously change from a weighted moving average of the first degradation information DI1 to a weighted moving average of the second edge information EI2 along the first direction DR1. In the second partial driving mode, the controller 140 provides to the data driver 130, as the output image data ODAT, the second partial image data PDAT2 for the second display region 112 and the second gradation data GDAT2 for the intermediate display region 113. In the second partial driving mode, the data driver 130 provides to the second display region 112, the data signals DS that correspond to the second partial image data PDAT2, and provides to the intermediate display region 113, the data signals DS that correspond to the second gradation data GDAT2. Thus, as illustrated in FIG. 6B, in the second partial driving mode, even if the controller 140 receives, as the input image data IDAT, only the second partial image data PDAT2 for the second display region 112, the controller 140 outputs, as the output image data ODAT, the second partial image data PDAT2 for the second display region 112 and the second gradation data GDAT2 for the intermediate display region 113. Accordingly, an image that corresponds to the second partial image data PDAT2 can be displayed in the second display region 112, and a second gradation image that corresponds to the second gradation data GDAT2 can be displayed in the intermediate display region 113.

When a white image is displayed in the first display region 111 for a long time without a gradation image, as represented by 210 in FIG. 7, a degradation degree of the first display region 111 is greater than a degradation degree of the intermediate display region 113 and the second display region 112, as represented by 230 in FIG. 7. Thus, the first display region 111 and the intermediate display region 113 have a degradation deviation. In this case, if the display device 100 degraded as represented by 230 in FIG. 7 operates in the normal driving mode, or the entire driving mode, to display a full white image in the entire display regions 111, 112 and 113 of the display panel 110, a luminance difference occurs between the first display region 111 and the intermediate display region 113 as represented by 250 in FIG. 7. Further, due to this luminance difference, an image sticking can be perceived by a user.

However, in the display device 100 according to exemplary embodiments, in the first partial driving mode in which an image is displayed in the first display region 111, the intermediate display region 113 displays the gradation image based on the first gradation data GDAT1 generated based on the first edge information EI1 and the second degradation information DI2 as represented by 220 in FIG. 7. Further, in the second partial driving mode in which an image is displayed in the second display region 112, the intermediate display region 113 displays the gradation image based on the second gradation data GDAT2 generated based on the first degradation information DI1 and the second edge information EI2. Thus, even if the display device 100 according to exemplary embodiments operates in the first partial driving mode for a long time, or even if a degradation degree of the first display region 111 differs from a degradation degree of the second display region 112, as represented by 240 in FIG. 7, no degradation deviation occurs between the first display region 111 and the intermediate display region 113, and no degradation deviation occurs between the intermediate display region 113 and the second display region 112. In this case, if the display device 100 according to exemplary embodiments degraded as represented by 240 in FIG. 7 operates in the normal driving mode to display the full white image in the entire display regions 111, 112 and 113 of the display panel 110, no luminance difference occurs between the first display region 111 and the intermediate display region 113 and between the intermediate display region 113 and the second display region 112, as represented by 260 in FIG. 7, and thus no image sticking is perceived by the user.

Figure 8:
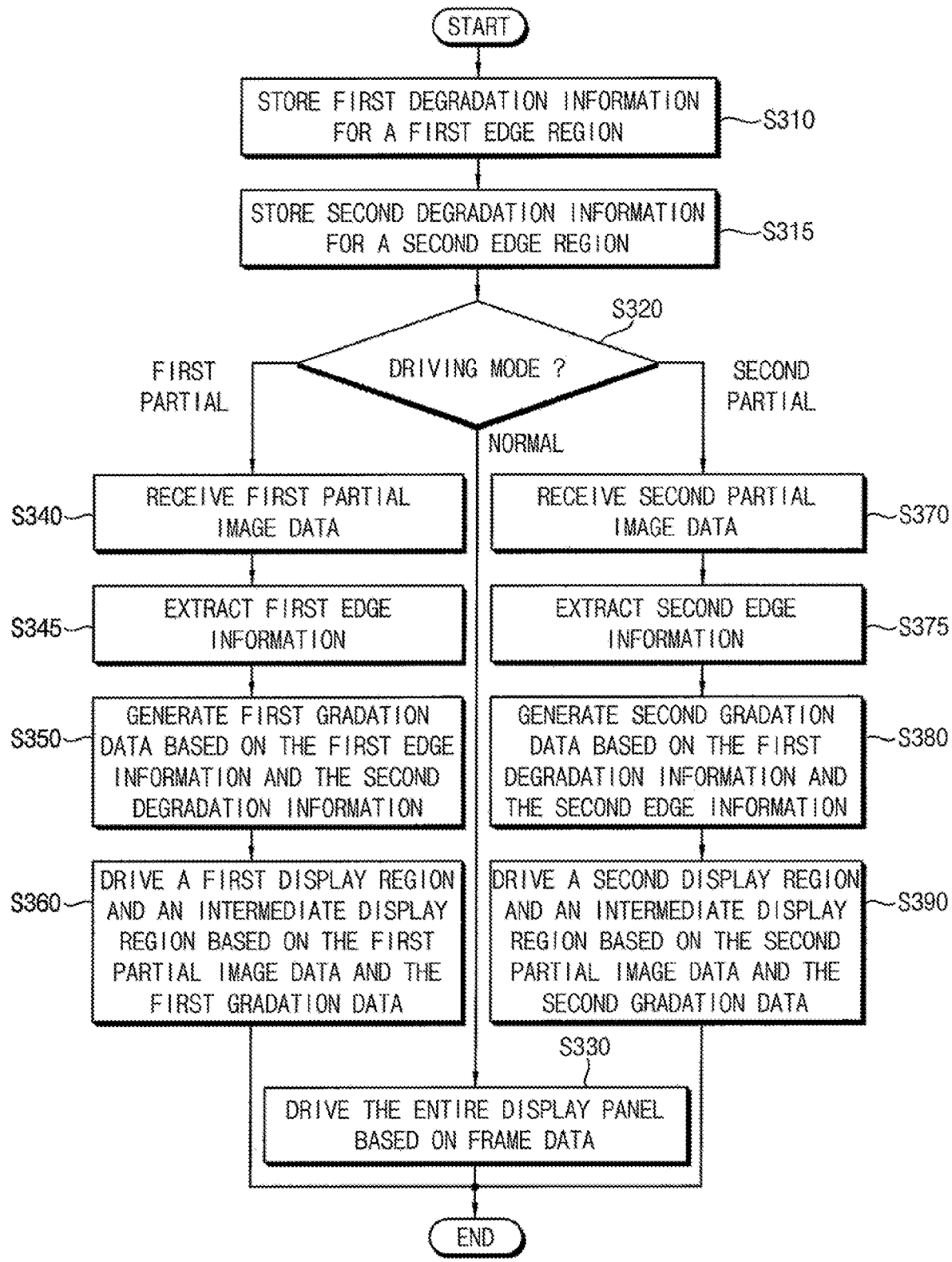
FIG. 8 is a flowchart of a method of operating a display device according to exemplary embodiments.
Figure 9:
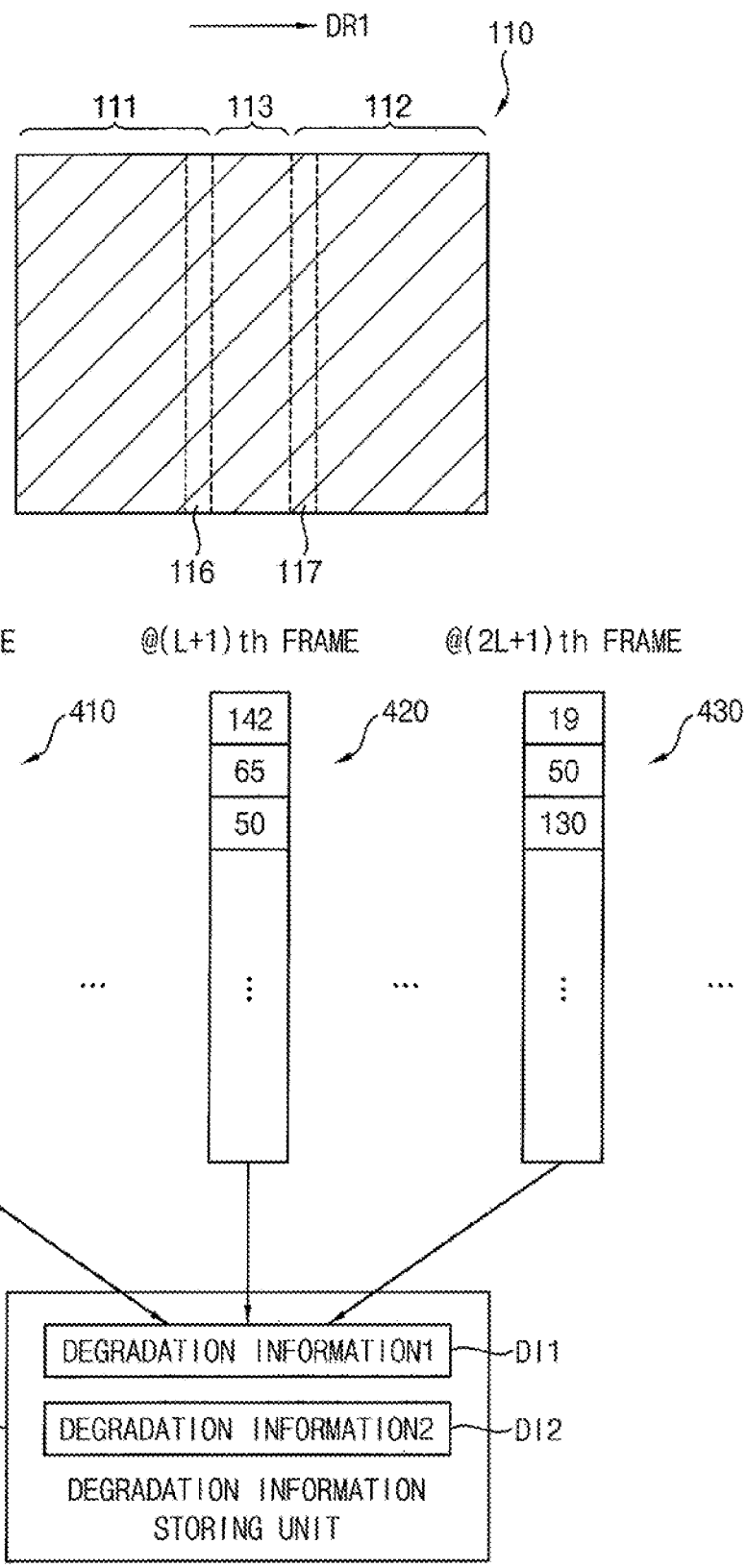
FIG. 9 illustrates an example where degradation information is updated in a method of FIG. 8.
Figure 10:
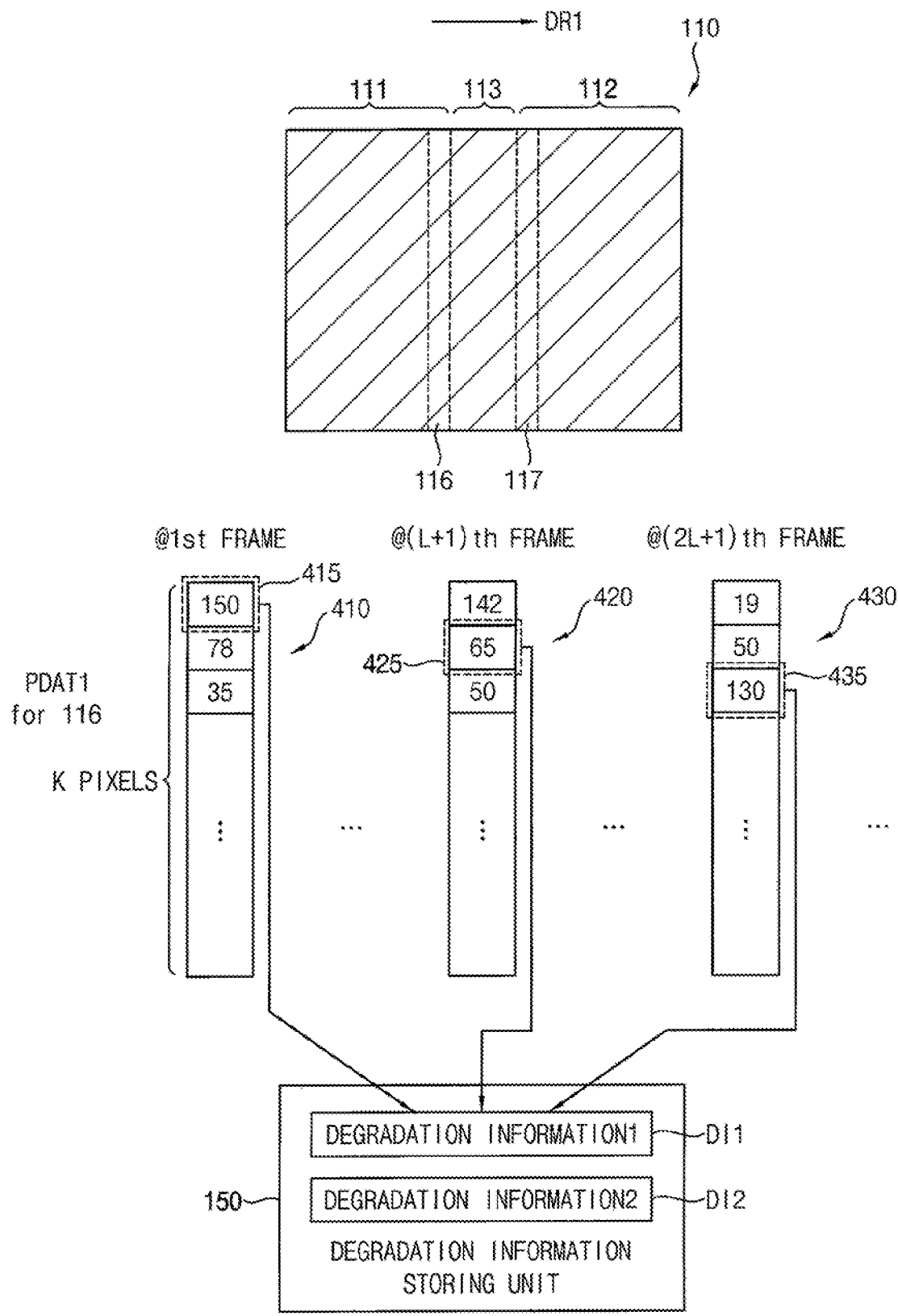
FIG. 10 illustrates another example where degradation information is updated in a method of FIG. 8.
Figure 11:
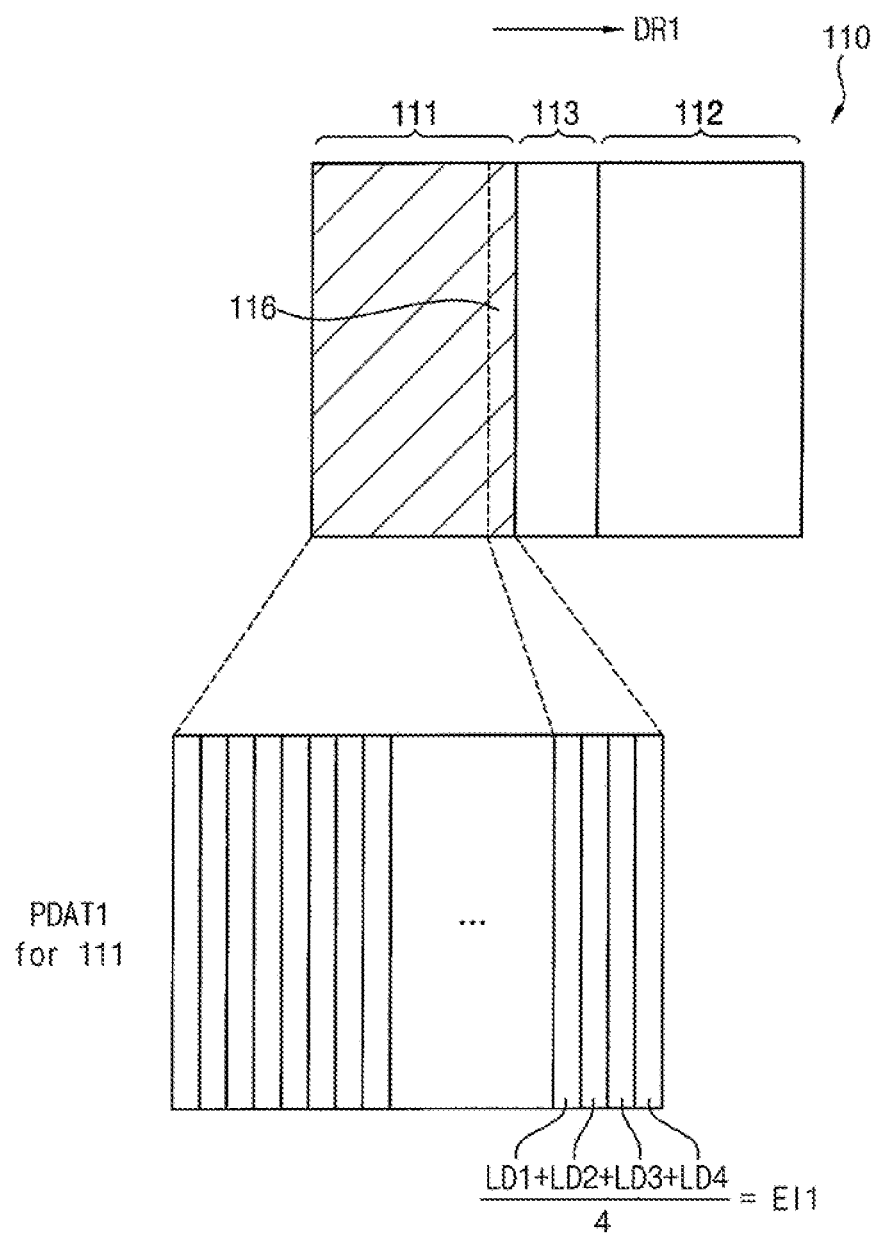
FIG. 11 illustrates an example where edge information is generated in a method of FIG. 8.
Figure 12:
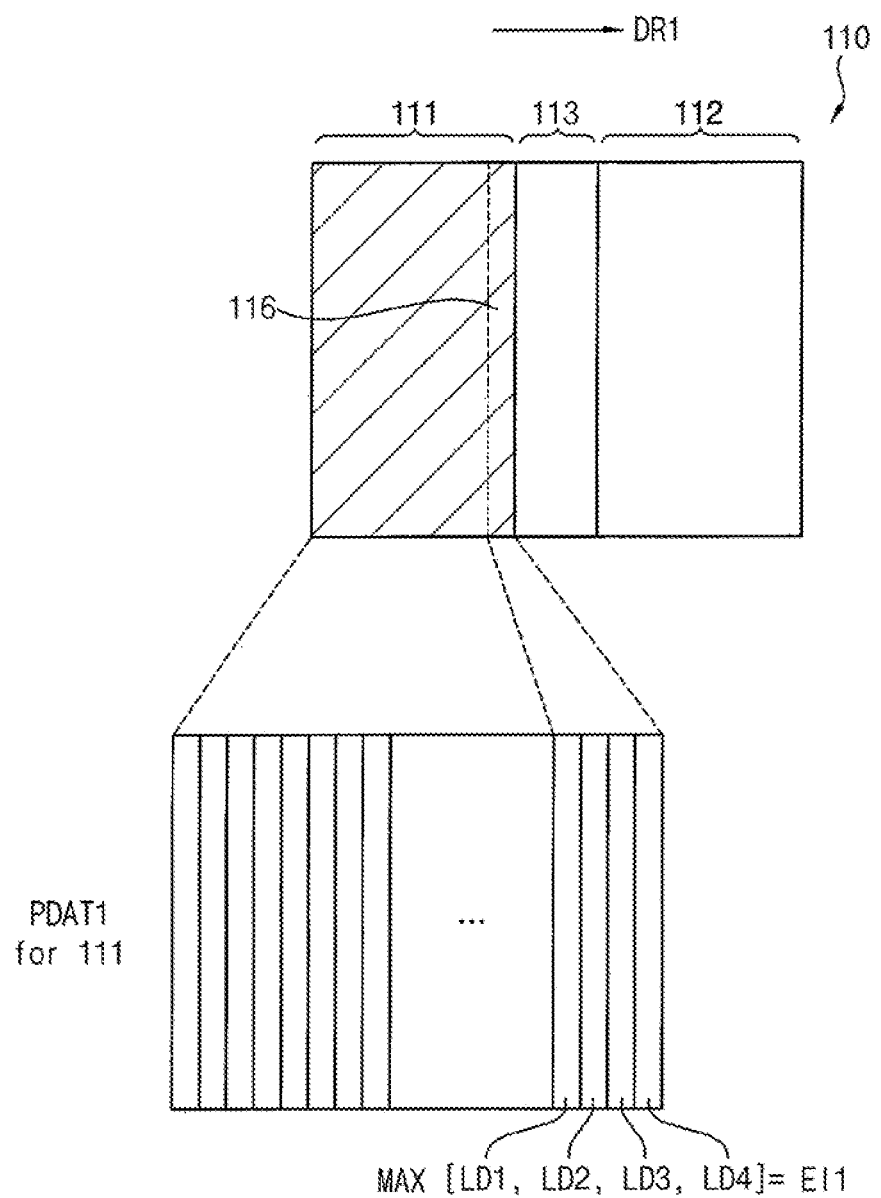
FIG. 12 illustrates another example where edge information is generated in a method of FIG. 8.
Figure 13:
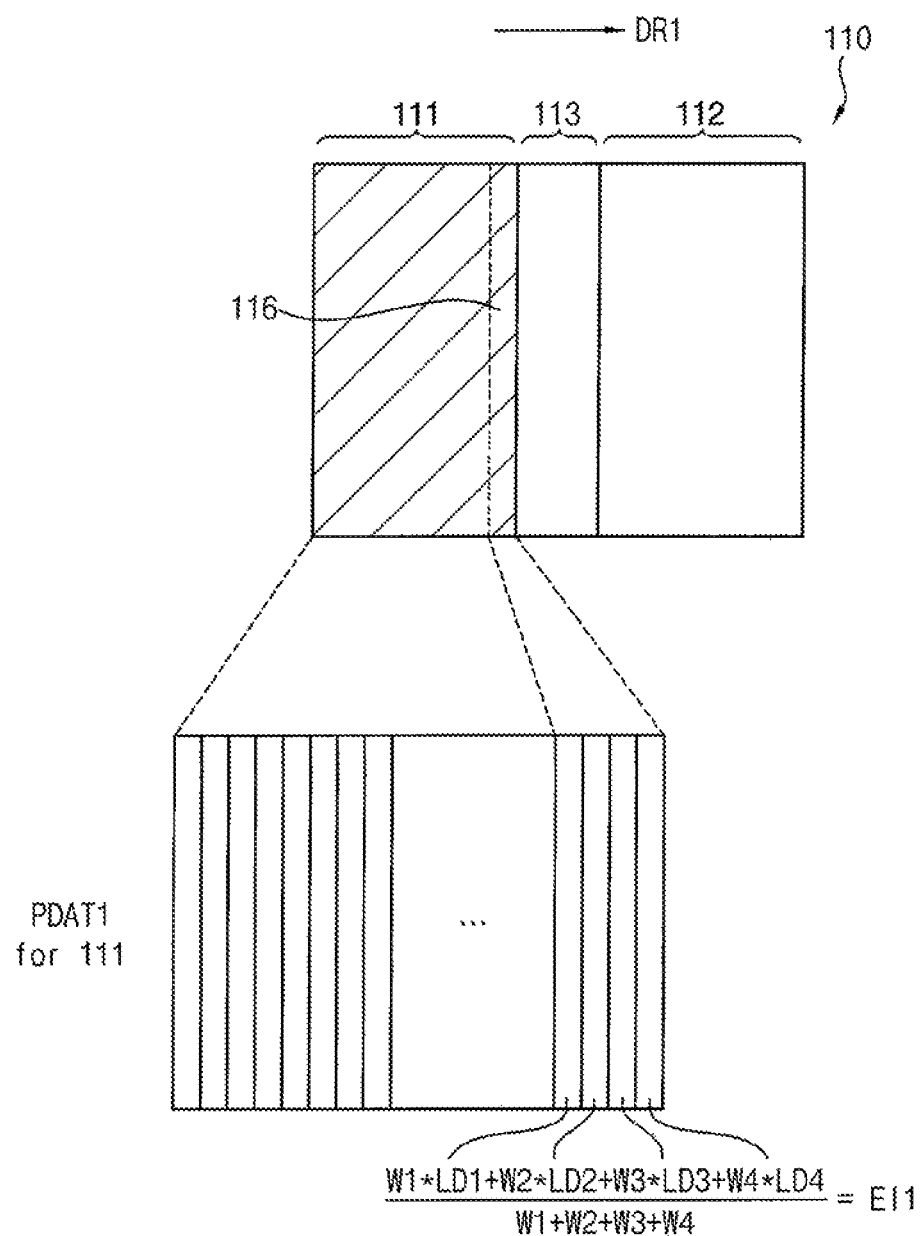
FIG. 13 illustrates still another example where edge information is generated in a method of FIG. 8.
Figure 14:
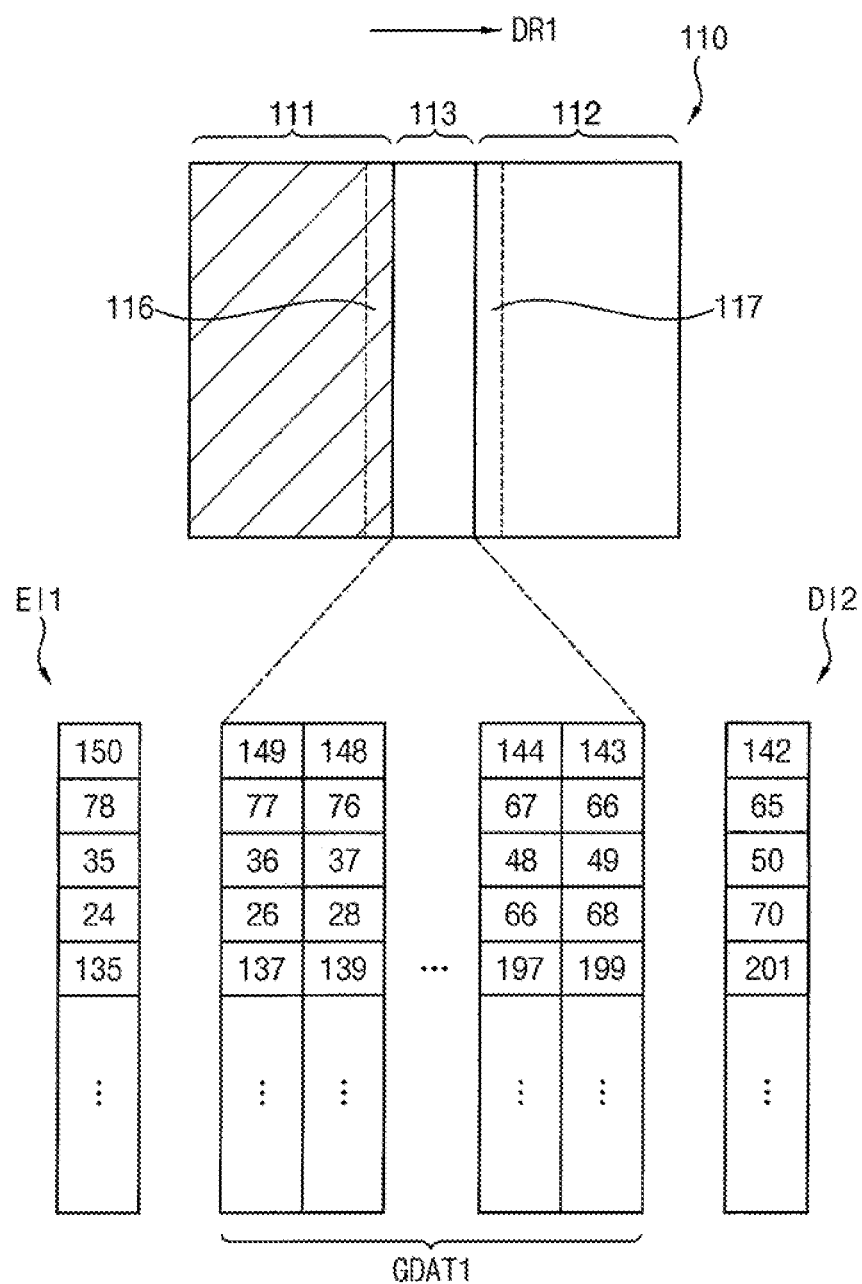
FIG. 14 illustrates an example where gradation data are generated based on edge information and degradation information in a method of FIG. 8.

FIG. 8 is a flowchart of a method of operating a display device according to exemplary embodiments, FIG. 9 illustrates an example where degradation information is updated in a method of FIG. 8, FIG. 10 illustrates another example where degradation information is updated in a method of FIG. 8, FIG. 11 illustrates an example where edge information is generated in a method of FIG. 8, FIG. 12 illustrates another example where edge information is generated in a method of FIG. 8, FIG. 13 illustrates still another example where edge information is generated in a method of FIG. 8, and FIG. 14 illustrates an example where gradation data are generated based on edge information and degradation information in a method of FIG. 8.

Referring to FIGS. 1 and 8, according to embodiments, a method of operating a display device 100 that includes a display panel 110 that includes a first display region 111, a second display region 112, and an intermediate display region 113 between the first display region 111 and the second display region 112, includes the steps of storing first degradation information DI1 for a first edge region within the first display region 111 that is adjacent to the intermediate display region 113 in a degradation information storage 150 (S310), and storing second degradation information DI2 for a second edge region within the second display region 112 that is adjacent to the intermediate display region 113 in the degradation information storage 150 (S315). According to exemplary embodiments, each of the first and second edge regions may include one pixel line coupled to one scan line (or one data line), a few pixel lines, or tens of pixel lines. In some exemplary embodiments, the first and second degradation information DI1 and DI2 are updated every frame.

In other exemplary embodiments, the first and second degradation information DI1 and DI2 are updated every L frames, where L is an integer greater than 0. For example, as illustrated in FIG. 9, as illustrated in FIG. 9, the first degradation information DI1 for the first edge region 116 is updated every L frames while the display device 100 operates in a normal driving mode in which the entire regions 111, 112 and 113 of the display panel 110 are driven, or in a first partial driving mode in which the first display region 111 is driven. For example, the first degradation information DI1 for each pixel or each row is updated in a first frame by calculating an average of accumulated gray values represented by the first degradation information DI1 and current gray values, such as 150, 78, 35, . . . , represented by current image data 410 for the first edge region 116, is updated in an (L+1)-th frame by calculating an average of accumulated gray values represented by the first degradation information DI1 and current gray values, such as 142, 65, 50, . . . represented by current image data 420 for the first edge region 116, and is updated in a (2L+1)-th frame by calculating an average of accumulated gray values represented by the first degradation information DI1 and current gray values, such as 19, 50, 130, . . . represented by current image data 430 for the first edge region 116. Similarly, the second degradation information DI2 for the second edge region 117 is updated every L frames while the display device 100 operates in the normal driving mode or in a second partial driving mode in which the second display region 112 is driven.

In still other exemplary embodiments, each of the first and second degradation information DI1 and DI2 includes K accumulated gray values, where K is an integer greater than 0, tire K accumulated gray values are sequentially selected or shifted by one pixel every L frames, and a selected one of the K accumulated gray values is updated every L frames. For example, as illustrated in FIG. 10, the first degradation information DI1 for a first pixel or a first row is updated in a first frame by calculating an average of an accumulated gray value represented by the first degradation information DI1 for the first pixel or the first row and a current gray value 415, i.e., 150, represented by current image data 410 for the first edge region 116. Similarly, the first degradation information DI1 for a second pixel or a second row is updated in an (L+1)-th frame by calculating an average of an accumulated gray value represented by the first degradation information DI1 for the second pixel or the second row and a current gray value 425, i.e., 65, represented by current image data 420 for the first edge region 116. Further, the first degradation information DI1 for a third pixel or a third row is updated in a (2L+1)-th frame by calculating an average of an accumulated gray value represented by the first degradation information DI1 for the third pixel or the third row and a current gray value 435, i.e., 130, represented by current image data 430 for the first edge region 116. In this manner, the entirety of each of the first and second degradation information DI1 and DI2 is updated per L×K frames.

According to embodiments, when the display device 100 operates in the normal driving mode in which the entire display regions 111, 112 and 113 of the display panel 110 are driven (S320: NORMAL), the display device 300 receives frame data FDAT as input image data IDAT, and drives the entire display regions 111, 112 and 113 of the display panel 110 based on the frame data FDAT (S330).

According to embodiments, when the display device 100 operates in the first driving mode in which the first display region 111 is driven (S320: FIRST PARTIAL), an edge information extractor 160 receives first partial image data PDAT1 for the first display region 111 (S340), and extracts first edge information EI1 for the first edge region from the first partial image data PDAT1 (S345).

In some exemplary embodiments, the first edge region includes M pixel lines, where M is an integer greater than 0, and the edge information extractor 160 generates the first edge information EI1 by calculating for each row an average of M gray levels represented by the first partial image data PDAT1 for the M pixel lines. For example, as illustrated in FIG. 11, the first edge region 116 includes first through fourth pixel lines, and the edge information extractor 160 generates the first edge information EI1 by calculating an average of first through fourth line data LD1, LD2, LD3 and LD4 for the first through fourth pixel lines in each row.

In other exemplary embodiments, the edge information extractor 160 generates the first edge information EI1 for each row by extracting a maximum value of the M gray levels represented by the first partial image data PDAT1 for the M pixel lines. For example, as illustrated in FIG. 12, the first edge region 116 includes first through fourth pixel lines, and the edge information extractor 160 generates the first edge information EI1 by extracting a maximum of the first through fourth gray values of first through fourth line data LD1, LD2, LD3 and LD4 for the first through fourth pixel lines in each row.

In still other exemplary embodiments, the edge information extractor 160 generates the first edge information EI1 for each row by calculating a weighted average of the M gray levels represented by the first partial image data PDAT1 for the M pixel lines with a weight that gradually or continuously decreases as a distance from the intermediate display region increases. For example, as illustrated in FIG. 13, the first edge region 116 includes first through fourth pixel lines. For each row, the edge information extractor 160 calculates a sum of a product of first line data LD1 and a first weight W1, a product of second line data LD2 and a second weight W2, a product of third line data LD3 and a third weight W3, and a product of fourth line data LD4 and a fourth weight W4, and generates the first edge information EI1 by dividing the calculated sum by a sum of the first through fourth weights W1, W2 W3 and W4. In this case, the first through fourth weights W1, W2 W3 and W4 decrease as a distance from the intermediate display region 113 increases. Thus, the fourth weight W4 for the fourth line data LD4, which is closest to the intermediate display region 113, has a relatively large value, and the first weight W1 for the first line data LD1 farthest from the intermediate display region 113, has a relatively small value.

According to embodiments, in the first partial driving mode, a gradation image generator 170 generates first gradation data GDAT1 for the intermediate display region 113 based on the first edge information EI1 for the first edge region of the first display region 111 and the second degradation information DI2 for the second edge region of the second display region 112 (S350).

In some exemplary embodiments, as illustrated in FIG. 14, the gradation image generator 170 generates the first gradation data GDAT1 such that the first gradation data GDAT1 for each row gradually or continuously change from a gray value represented by the first edge information EI1 to a gray value represented by the second degradation information DI2, along a first direction DR1 from the first display region 111 to the second display region 112. For example, in a first row, when the first edge information EI1 represents a gray value of 150 and the second degradation information DI2 represents a gray value of 142, the first gradation data GDAT1 represents 149, 148, . . . , 144 and 143. Further, in a second row, when the first edge information EI1 represents a gray value of 78 and the second degradation information DI2 represents a gray value of 65, the first gradation data GDAT1 represents 77, 76, . . . , 67 and 66. Further, in a third row, when the first edge information EI1 represents a gray value of 35 and the second degradation information DI2 represents a gray value of 50, the first gradation data GDAT1 represents 36, 37, . . . 48 and 49. Further, in a fourth row, when the first edge information EI1 represents a gray value of 24 and the second degradation information DI2 represents a gray value of 70, the first gradation data GDAT1 represents 26, 28, . . . , 66 and 68. Further, in a fifth row, when the first edge information EI1 represents a gray value of 135 and the second degradation information DI2 represents a gray value of 201, the first gradation data GDAT1 represents 137, 139, . . . , 197 and 199.

According to embodiments, in the first partial driving mode, the display device 100 drives the first display region 111 and the intermediate display region 113 based on the first partial image data PDAT1 and the first gradation data GDAT1 (S360). Accordingly, no degradation deviation occurs between the first display region 111 and the intermediate display region 113, and between the intermediate display region 113 and the second display region 112, and thus no image sticking is perceived by a user.

According to embodiments, when the display device 100 operates in the second driving mode in which the second display region 112 is driven (S320: SECOND PARTIAL), the edge information extractor 160 receives second partial image data PDAT2 for the second display region 112 (S370), and extracts second edge information EI2 for the second edge region from the second partial image data PDAT2 (S375). According to exemplary embodiments, the edge information extractor 160 generates the second edge information EI2 by using one of an average, a maximum value or a weighted average.

According to embodiments, in the second partial driving mode, the gradation image generator 170 generates second gradation data GDAT2 for the intermediate display region 113 based on the first degradation information DI1 for the first edge region of the first display region 111 and the second edge information EI2 for the second edge region of the second display region 112 (S380). In some exemplary embodiments, the gradation image generator 170 generates the second gradation data GDAT2 for each row such that the second gradation data GDAT2 gradually or continuously change from a gray value represented by the first degradation information DI1 to a gray value represented by the second edge information E22 along the first direction DR1.

According to embodiments, in the second partial driving mode, the display device 100 drives the second display region 112 and the intermediate display region 113 based on the second partial image data PDAT2 and the second gradation data GDAT2 (S390). Accordingly, no degradation deviation occurs between the first display region 111 and the intermediate display region 113, and between the intermediate display region 113 and the second display region 112, and thus no image sticking is perceived by the user.

Figure 15:
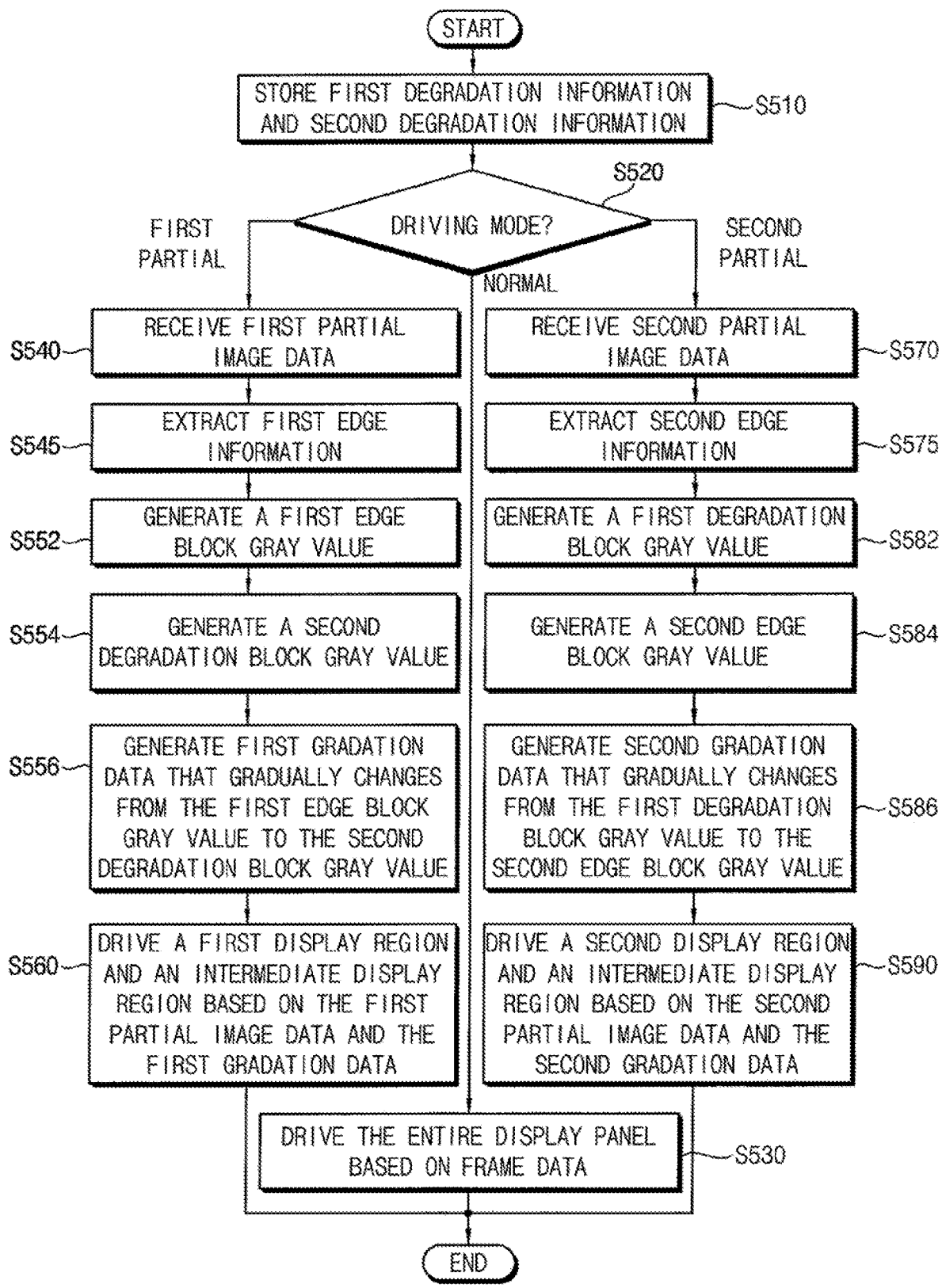
FIG. 15 is a flowchart of a method of operating a display device according to exemplary embodiments.
Figure 16:
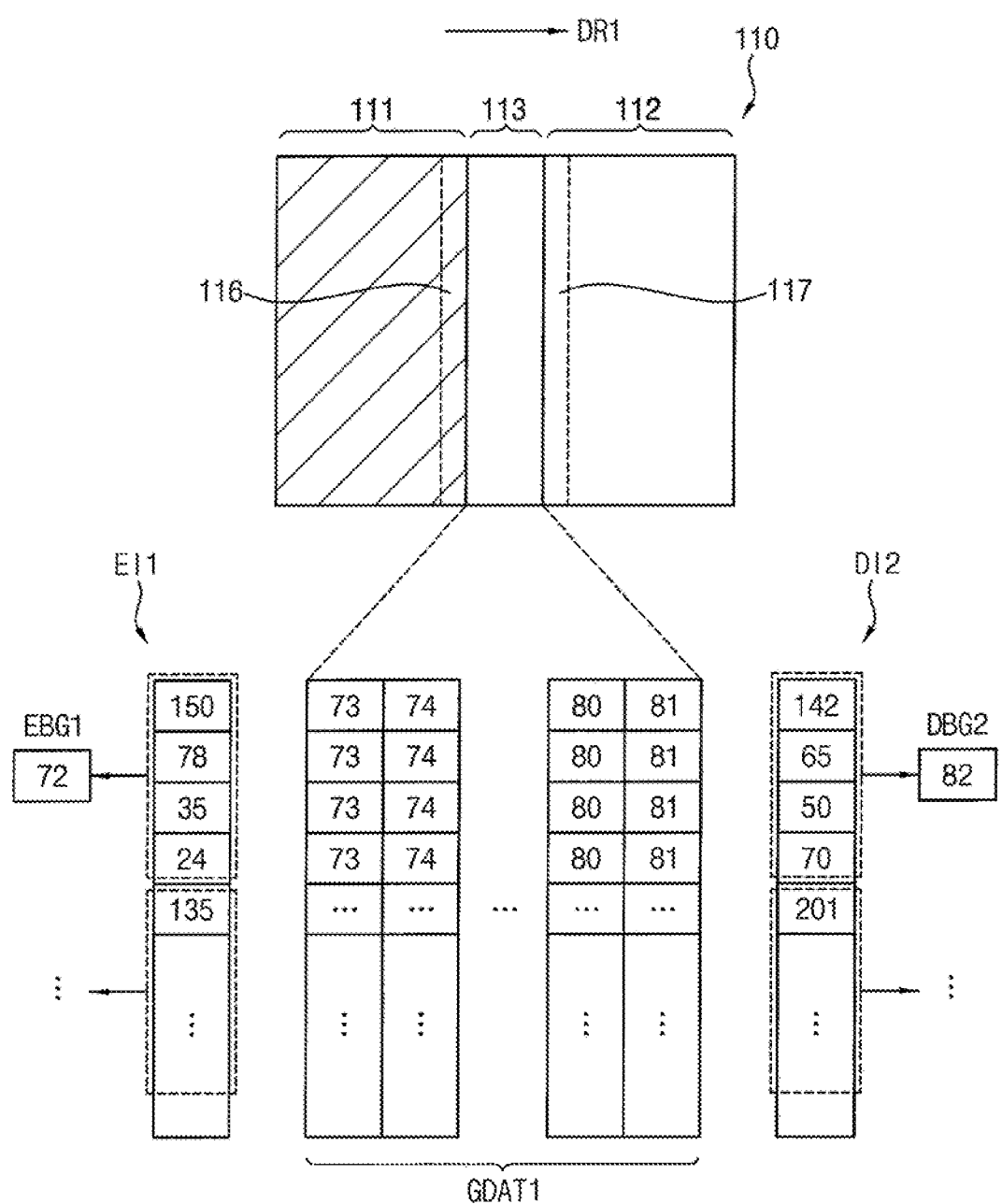
FIG. 16 illustrates an example where gradation data are generated based on edge information and degradation information in a method of FIG. 15.

FIG. 15 is a flowchart of a method of operating a display device according to exemplary embodiments, and FIG. 16 illustrates an example where gradation data are generated based on edge information and degradation information in a method of FIG. 15.

Referring to FIGS. 1 and 15, a method of operating a display device 100 that includes a display panel 110 that includes a first display region 111, a second display region 112, and an intermediate display region 113 between the first display region 111 and the second display region 112, includes the step of storing first degradation information DI1 for a first edge region of the first display region 111 and second degradation information DI2 for a second edge region of the second display region 112 in a degradation information storage 150 (S510).

According to embodiments, when the display device 100 operates in a normal driving mode in which the entire display regions 111, 112 and 113 of the display panel 110 are driven (S520: NORMAL), the display device 100 receives frame data FDAT as input image data IDAT, and drives the entire display regions 111, 112 and 113 of the display panel 110 based on the frame data FDAT (S530).

According to embodiments, when the display device 100 operates in a first driving mode in which the first display region 111 is driven (S520: FIRST PARTIAL), an edge information extractor 160 receives first partial image data PDAT1 for the first display region 111 (S540), and extracts first edge information EI1 for the first edge region from the first partial image data PDAT1 (S545). According to exemplary embodiments, the edge information extractor 160 generates the first edge information EI1 by using one of an average, a maximum value or a weighted average.

According to embodiments, in the first partial driving mode, a gradation image generator 170 calculates a first edge block gray value by calculating an average of N consecutive gray values represented by the first edge information EI1 (S552), where N is an integer greater than 1, calculates a second degradation block gray value by calculating an average of N consecutive gray values represented by the second degradation information DI2 (S554), and generates first gradation data GDAT1 that gradually or continuously change from the first edge block gray value to the second degradation block gray value along the first direction DR1 from the first display region 111 to the second display region 112 (S556). That is, the first gradation data GDAT1 is generated for a unit of a block having N rows.

For example, according to embodiments, as illustrated in FIG. 16, the gradation image generator 170 generates the first gradation data GDAT1 for a unit of a block having four rows. For example, in the first through fourth rows, when the first edge information EI1 represents gray values of 150, 78, 35 and 24, and the second edge information DI2 represents gray values of 142, 65, 50 and 70, the gradation image generator 170 calculates the first edge block gray value EBG1 of 72 by calculating an average of 150, 78, 35 and 24, calculates the second degradation block gray value DBG2 of 82 by calculating an average of 142, 65, 50 and 70, and generate the first gradation data GDAT1 representing 73, 74, . . . , 80 and 81 in each of the first through fourth rows. In this manner, the first gradation data GDAT1 is generated in units of a block having four rows. Although FIG. 16 illustrates an example where each block includes four rows and one column, embodiments are not limited thereto, and according to other exemplary embodiments, each block may have one or more rows and one or more columns.

According to embodiments, in the first partial driving mode, the display device 100 drive the first display region 111 and the intermediate display region 113 based on the first partial image data PDAT1 and the first gradation data GDAT1 (S560). Accordingly, no degradation deviation occurs between the first display region 111 and the intermediate display region 113, and between the intermediate display region 113 and the second display region 112, and thus no an image sticking is perceived by a user.

According to embodiments, when the display device 100 operates in the second driving mode in which the second display region 112 is driven (S520: SECOND PARTIAL), the edge information extractor 160 receives second partial image data PDAT2 for the second display region 112 (S570), and extracts second edge information EI2 for the second edge region from the second partial image data PDAT2 (S575). According to exemplary embodiments, the edge information extractor 160 generates the second edge information EI2 by using one of an average, a maximum value or a weighted average.

According to embodiments, in the second partial driving mode, the gradation image generator 170 calculates a first degradation block gray value by calculating an average of N consecutive gray values represented by the final degradation information DU (S582), calculates a second edge block gray value by calculating an average of N consecutive gray values represented by the second edge information EI2 (S584), and generates second gradation data GDAT2 such that the second gradation data GDAT2 gradually or continuously change from the first degradation block gray value to the second edge block gray value along the first direction DR1 (S586). That is, the second gradation data GDAT2 is generated for units of a block having N rows.

According to embodiments, in the second partial driving mode, the display device 100 drives the second display region 112 and the intermediate display region 113 based on the second partial image data PDAT2 and the second gradation data GDAT2 (S590). Accordingly, no degradation deviation occurs between the first display region 111 and the intermediate display region 113, and between the intermediate display region 113 and the second display region 112, and thus no image sticking is perceived by the user.

Figure 17:
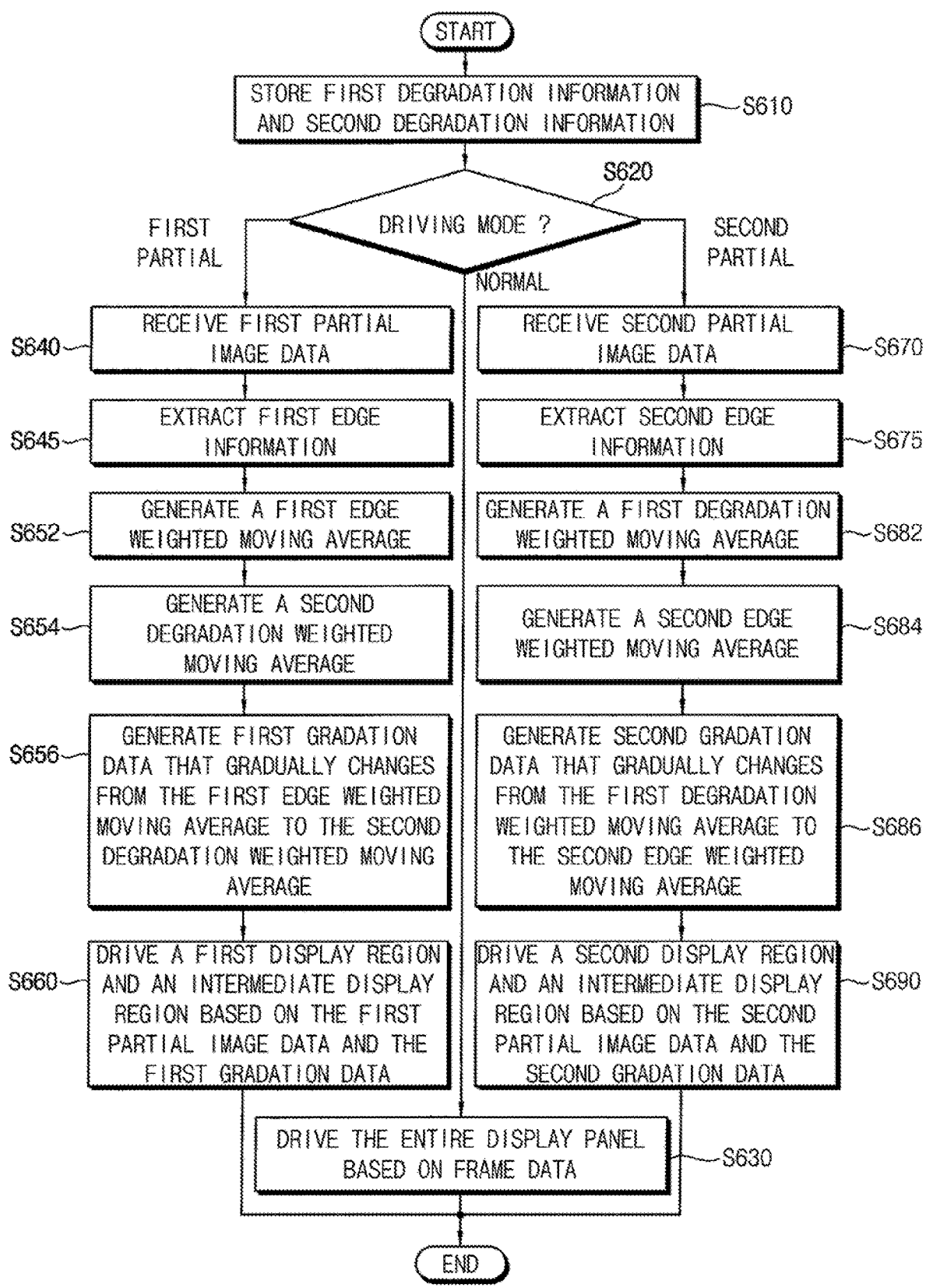
FIG. 17 is a flowchart of a method of operating a display device according to exemplary embodiments.
Figure 18:
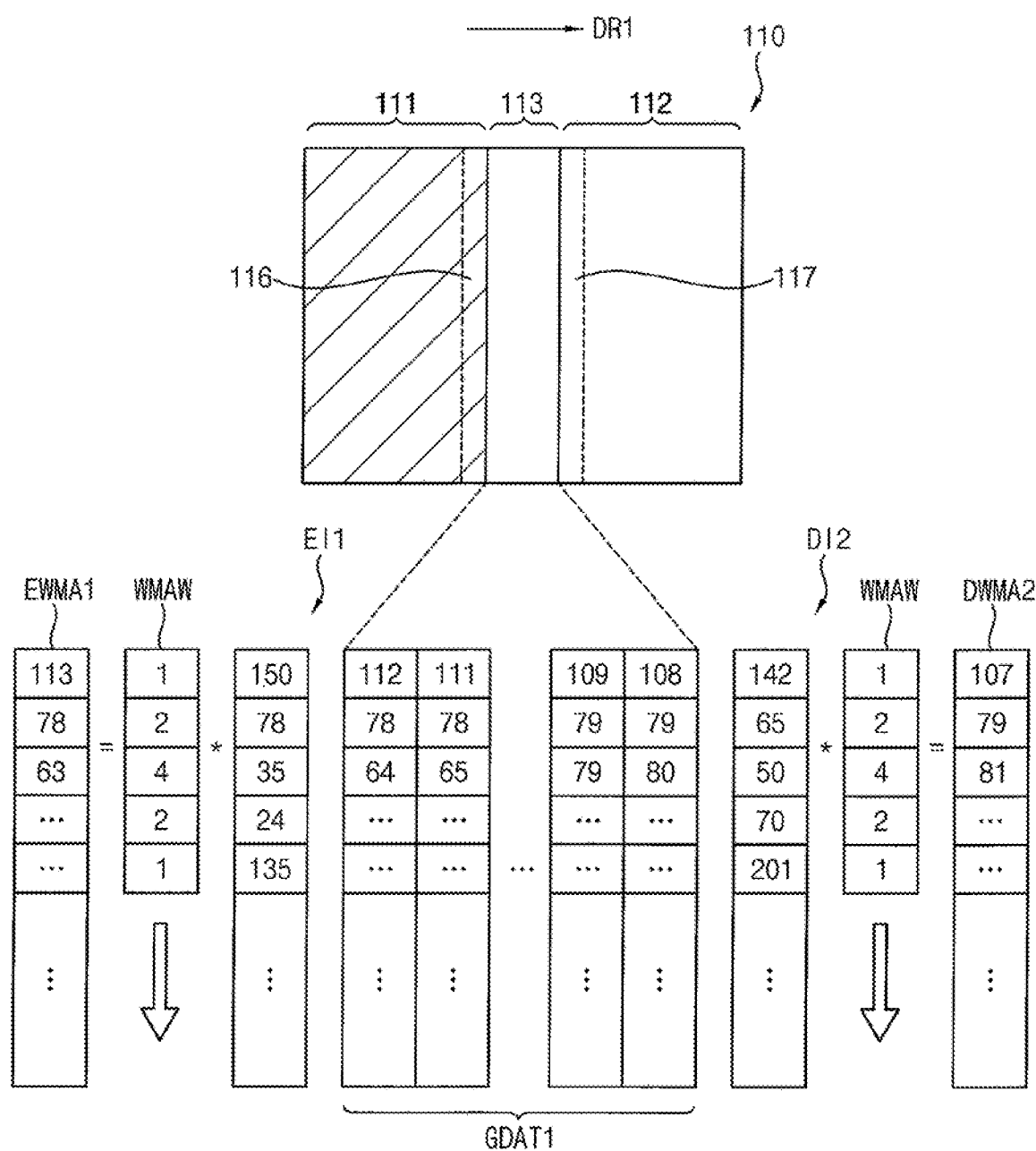
FIG. 18 illustrates an example where gradation data are generated based on edge information and degradation information in a method of FIG. 17.

FIG. 17 is a flowchart of a method of operating a display device according to exemplary embodiments, and FIG. 18 illustrates an example where gradation data are generated based on edge information and degradation information in a method of FIG. 17.

Referring to FIGS. 1 and 17, According to embodiments, a method of operating a display device 100 that includes a display panel 110 that includes a first display region 111, a second display region 112, and an intermediate display region 113 between the first display region 111 and the second display region 112, includes a step of storing first degradation information DI1 for a first edge region of the first display region 111 and second degradation information DI2 for a second edge region of the second display region 112 in a degradation information storage 150 (S610).

According to embodiments, when the display device 100 operates in a normal driving mode in which the entire display regions 111, 112 and 113 of the display panel 110 are driven (S620: NORMAL), the display device 100 receives frame data FDAT as input image data IDAT, and drives the entire display regions 111, 112 and 113 of the display panel 110 based on the frame data FDAT (S630).

According to embodiments, when the display device 100 operates in a first driving mode in which the first display region 111 is driven (S620: FIRST PARTIAL), an edge information extractor 160 receives first partial image data PDAT1 for the first display region 111 (S640), and extracts first edge information EI1 for the first edge region from the first partial image data PDAT1 (S645). According to exemplary embodiments, the edge information extractor 160 generates the first edge information EI1 by using one of an average, a maximum value or a weighted average.

According to embodiments, in the first partial driving mode, a gradation image generator 170 calculates a first edge weighted moving average by calculating a weighted moving average of N consecutive gray values represented by the first edge information EI1 (S652), where N is an integer greater than 1, calculates a second degradation weighted moving average by calculating a weighted moving average of N consecutive gray values represented by the second degradation information DI2 (S654), and generates first gradation data GDAT1 such that the first gradation data GDAT1 gradually or continuously change from the first edge weighted moving average to the second degradation weighted moving average along the first direction DR1 from the first display region to the second display region (S656).

For example, according to embodiments, as illustrated in FIG. 18, the gradation image generator 170 calculates the first edge weighted moving average EWMA1 by applying a weighted moving average window WMAW with weights of 1, 2, 4, 2 and 1 to the first edge information EI1. For example, when the first edge information EI1 represents 150, 78, 35, 24, 135, . . . , the gradation image generator 170 calculates the first edge weighted moving average EWMA1 representing 113, 78, 63 . . . . For example, the first edge weighted moving average EWMA1 for a first row may be calculated by using an equation, "(150*4+78*2+35*1)/(4+2+1)*113", the first edge weighted moving average EWMA1 for a second row may be calculated by using an equation, "(150*2+78*4+35*2+24*1)/(2+4+2+1)=78", and the first edge weighted moving average EWMA1 for a third row may be calculated by using an equation, "(150*1+78*2+35*4+24*2+135*1)/(1+2+4+2+1)+63" Further, the gradation image generator 170 calculates the second degradation weighted moving average DWMA2 by applying the weighted moving average window WMAW with the weights of 1, 2, 4, 2 and 1 to the first edge information EI1. For example, when the second degradation information DI2 represents 142, 65, 50, 70, 201, . . . , the gradation image generator 170 calculates the second degradation weighted moving average DWMA2 representing 107, 79, 81 . . . . For example, the second degradation weighted moving average DWMA2 for the first row may be calculated by using an equation, "(142*4−65*2+50*1)/(4+2+1)=107", the second degradation weighted moving average DWMA2 for the second row may be calculated by using an equation, "(142*2+65*4+50*2+70*1)/(2+4+2+1)=79", and the second degradation weighted moving average DWMA2 for the third row may be calculated by using an equation. "(142*1+65*2+50*4+70*2+201*1)/(1+2+4+2+1)=81" In this case, the gradation image generator 170 generates the first gradation data GDAT1 representing 112, 111, . . . , 109 and 108 in the first row, representing 78, 78, . . . , 79 and 79 in the second row, and representing 64, 65, . . . , 79 and 80 in the third row.

According to embodiments, in the first partial driving mode, the display device 100 drives the first display region 111 and the intermediate display region 113 based on the first partial image data PDAT1 and the first gradation data GDAT1 (S660). Accordingly, no degradation deviation occurs between the first display region 111 and the intermediate display region 113, and between the intermediate display region 113 and the second display region 112, and thus no image sticking is perceived by a user.

According to embodiments, when the display device 100 operates in the second driving mode in which the second display region 112 is driven (S620: SECOND PARTIAL), the edge information extractor 160 receives second partial image data PDAT2 for the second display region 112 (S670), and extracts second edge information EI2 for the second edge region from the second partial image data PDAT2 (S675). According to exemplary embodiments, the edge information extractor 160 generates the second edge information EI2 by using one of an average, a maximum value or a weighted average.

According to embodiments, in the second partial driving mode, the gradation image generator 170 calculates a first degradation weighted moving average by calculating a weighted moving average of N consecutive gray values represented by the first degradation information DI1 (S682), calculates a second edge weighted moving average by calculating a weighted moving average of N consecutive gray values represented by the second edge information EI2 (S684), and generates second gradation data GDAT2 such that the second gradation data GDAT2 gradually or continuously change from the first degradation weighted moving average to the second edge weighted average along the first direction DR1 (S686).

According to embodiments, in the second partial driving mode, the display device 100 drives the second display region 112 and the intermediate display region 113 based on the second partial image data PDAT2 and the second gradation data GDAT2 (S690). Accordingly, no degradation deviation occurs between the first display region 111 and the intermediate display region 113, and between the intermediate display region 113 and the second display region 112, and thus no image sticking is perceived by the user.

Figure 19:
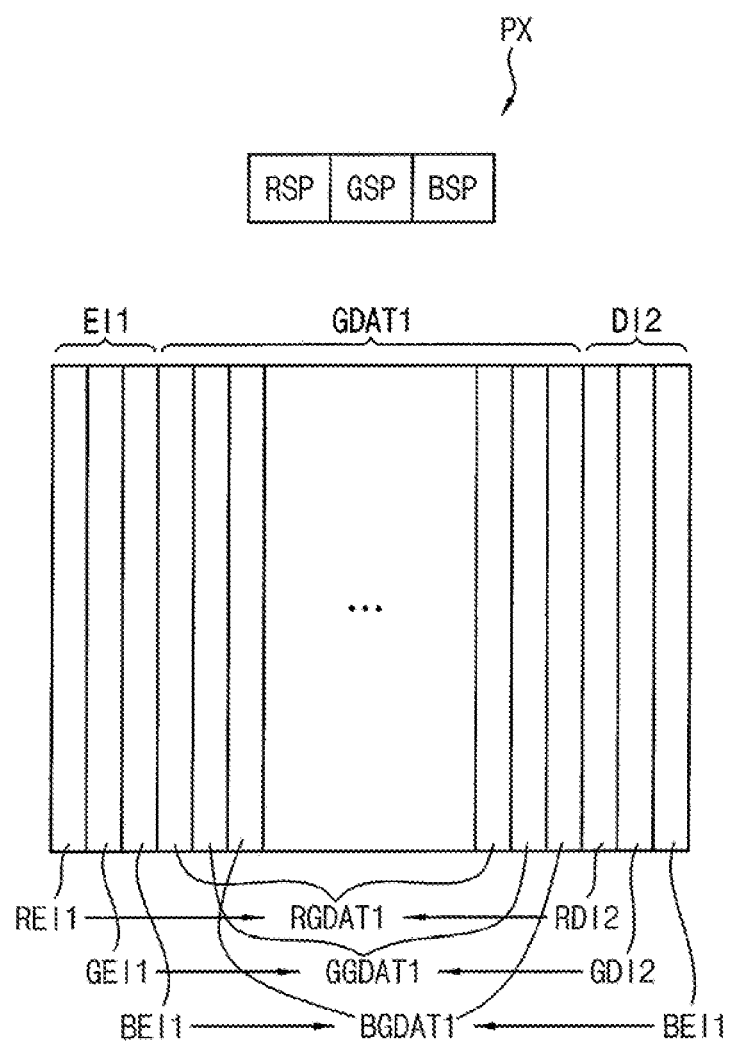
FIG. 19 illustrates an example where gradation data are generated with respect to each of a red sub-pixel, a green sub-pixel and a blue sub-pixel in a display device according to exemplary embodiments.

FIG. 19 illustrates an example where gradation data are generated with respect to each of a red sub-pixel, a green sub-pixel and a blue sub-pixel in a display device according to exemplary embodiments.

Referring to FIGS. 1 and 19, according to embodiments, each pixel PX of a display panel 110 includes a red sub-pixel RSP, a green sub-pixel GSP and a blue sub-pixel BSP. The gradation image generator 170 generates first gradation data GDAT1 with respect to each of the red sub-pixel RSP, the green sub-pixel GSP and the blue sub-pixel BSP in the first partial driving mode, and generate second gradation data GDAT2 with respect to each of the red sub-pixel RSP, the green sub-pixel GSP and the blue sub-pixel BSP in the second partial driving mode.

For example, according to embodiments. First edge information EI1 includes first red edge information REI1 for the red sub-pixel RSP, first green edge information GEI1 for the green sub-pixel GSP, and first blue edge information BEI1 for the blue sub-pixel BSP. Further, second degradation information DI2 includes second red degradation information RDI2 for the red sub-pixel RSP, second green degradation information GDI2 for the green sub-pixel GSP, and second blue degradation information BDI2 for the blue sub-pixel BSP. The gradation image generator 170 generates, as the first gradation data GDAT1, first red gradation data RGDAT1 for the red sub-pixel RSP based on the first red edge information REI1 and the second red degradation information RDI2, first green gradation data GGDAT1 for the green sub-pixel GSP based on the first green edge information GEI1 and the second green degradation information GDI2, and first blue gradation data BGDAT1 for the blue sub-pixel BSP based on lire first blue edge information BEI1 and the second blue degradation information BDI2.

Figure 20:
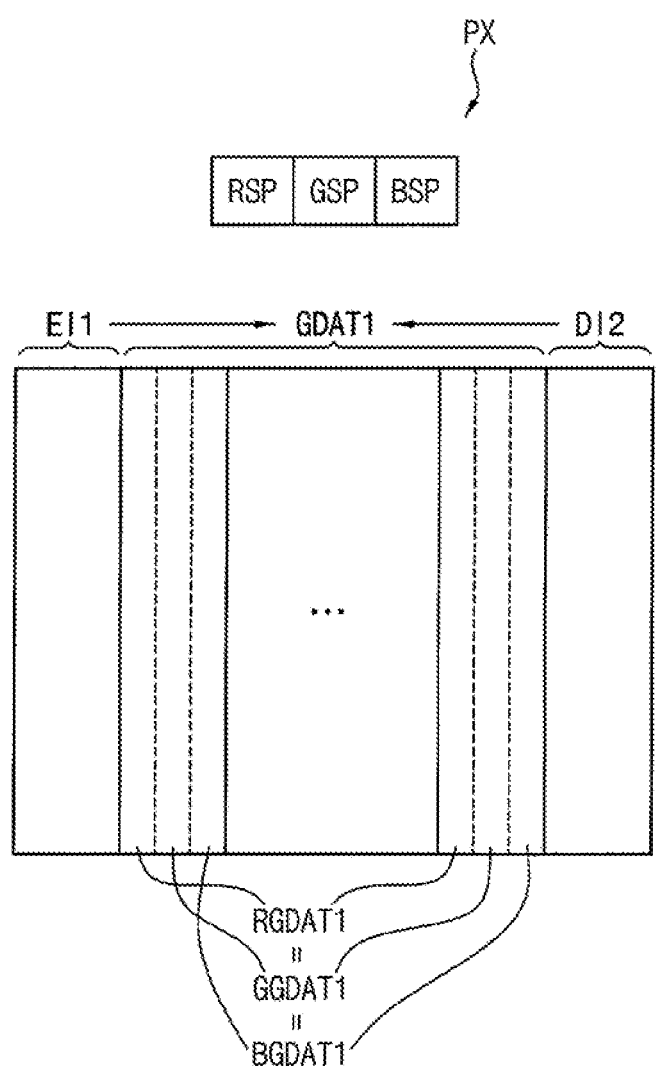
FIG. 20 illustrates an example where gradation data are generated which have the same gray value with respect to a red sub-pixel, a green sub-pixel and a blue sub-pixel in a display device according to exemplary embodiments.

FIG. 20 illustrates an example where gradation data are generated which have the same gray value with respect to a red sub-pixel, a green sub-pixel and a blue sub-pixel in a display device according to exemplary embodiments.

Referring to FIGS. 1 and 20, according to embodiments, each pixel PX of a display panel 110 includes a red sub-pixel RSP, a green sub-pixel GSP and a blue sub-pixel BSP. The gradation image generator 170 generates first gradation data GDAT1 that represents a first same gray value with respect to the red sub-pixel RSP, the green sub-pixel GSP and the blue sub-pixel BSP in the same pixel PX in the first partial driving mode, and generates second gradation data GDAT2 that represents a second same gray value with respect to the red sub-pixel RSP, the green sub-pixel GSP and the blue sub-pixel BSP in the same pixel PX in the second partial driving mode. For example, as illustrated in FIG. 20, first red gradation data RGDAT1, first green gradation data GGDAT1 and first blue gradation data BGDAT1 in the first gradation data GDAT1 represent the same gray value with respect to the red sub-pixel RSP, the green sub-pixel GSP and the blue sub-pixel BSP in each pixel PX.

Figure 21:
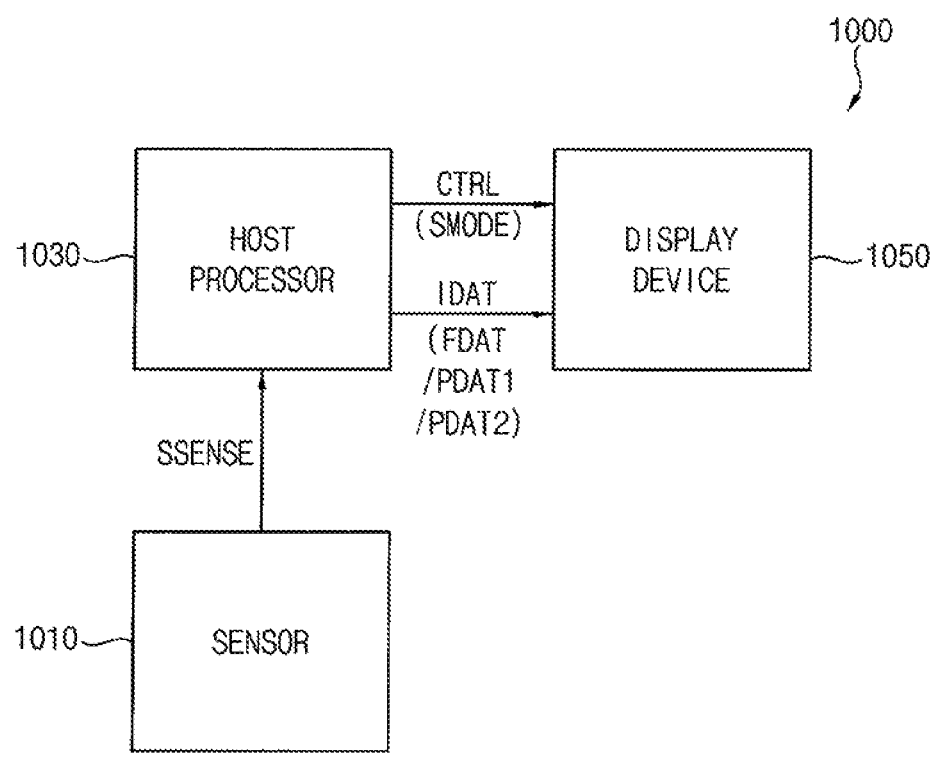
FIG. 21 illustrates an electronic device that includes a display device according to exemplary embodiments.

FIG. 21 illustrates an electronic device that includes a display device according to exemplary embodiments.

Referring to FIG. 21, an electronic device 1000 according to exemplary embodiments includes a sensor 1010, a host processor 1030 and a display device 1050. In some exemplary embodiments, the electronic device 1000 further includes a memory device, a storage device, an input/output (I/O) device, a power supply, etc.

According to embodiments, the sensor 1010 senses an operating state or deformation of the display device 1050, and provides a sense signal SSENSE that is indicative of the deformation to the host processor 1030. For example, the sense signal SSENSE may indicate that the display device 1050 is not folded, may indicate that the display device 1050 is folded such that a first display region is located in a front side and a second display region is located in a back side as illustrated in FIG. 3A, or may indicate that the display device 1050 is folded such that the first display region is located in the back side and the second display region is located in the front side as illustrated in FIG. 3B.

According to embodiments, the host processor 1030 can perform various computing functions or tasks. The host processor 1030 may be one of an application processor (AP) that includes a graphics processing unit (GPU), a central processing unit (CPU), or a micro processor, etc. The host processor 1030 provides a control signal CTRL, and input image data IDAT to the display device 1050. For example, the host processor 1030 may provide to the display device 1050 a mode signal SMODE that indicates a normal driving mode and frame data FDAT in response to the sense signal SSENSE indicating that the display device 1050 is not folded, may provide to the display device 1050 the mode signal SMODE that indicates a first partial driving mode in which the first display region is driven and first partial image data PDAT1 in response to the sense signal SSENSE indicating that the display device 1050 is folded such that the first display region is located in the front side and the second display region is located in the back side, and may provide to the display device 1050 the mode signal SMODE that indicates a second partial driving mode in which the second display region is driven and second partial image data PDAT2 in response to the sense signal SSENSE indicating that the display device 1050 is folded such that the first display region is located in the back side and the second display region is located in the front side.

According to embodiments, the display device 1050 displays an image based on the control signal CTRL and input image data IDAT. The display device 1050 stores first degradation information for a first edge region of the first display region and second degradation information for a second edge region of the second display region. In response to the mode signal SMODE indicating the first partial driving mode, the display device 1050 generates first gradation data for an intermediate display region based on first edge information for the first edge region and the second degradation information for the second edge region, displays an image that corresponds to the first partial image data PDAT1 in the first display region, and displays a gradation image that corresponds to the first gradation data in the intermediate display region. Further, in response to the mode signal SMODE indicating the second partial driving mode, the display device 1050 generates second gradation data for the intermediate display region based on the first degradation information for the first edge region and second edge information for the second edge region, displays an image that corresponds to the second partial image data PDAT2 in the second display region, and displays a gradation image that corresponds to the second gradation data in the intermediate display region. Accordingly, in the display device 1050 according to exemplary embodiments, no image sticking is perceived between the first edge region and the intermediate display region and between the intermediate display region and the second edge region.

Embodiments of the inventive concepts can be implemented in any display device 1050, and any electronic device 1000 that includes the display device 1050. For example, embodiments of the inventive concepts can be implemented in a mobile phone, a smart phone, a wearable electronic device, a tablet computer, a television (TV), a digital TV, a 3D TV, a personal computer (PC), a home appliance, a laptop computer, a personal digital assistant (PDA), a portable multimedia player (PMP), a digital camera, a music player, a portable game console, or a navigation device, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of embodiments of the present inventive concept. Accordingly, all such modifications are intended to be included within the scope of embodiments of the present inventive concept as defined in the claims. Therefore, it is to be understood that the foregoing is illustrative of various embodiments and is not to be construed as limited to the specific exemplary embodiments disclosed, and that modifications to the disclosed exemplary embodiments, as well as other embodiments, are intended to be included within the scope of the appended claims.

What is claimed is:

1. A display device, comprising:
a display panel that includes a first display region, a second display region, and an intermediate display region located between the first display region and the second display region;
a degradation information storage that stores first degradation information for a first edge region within the first display region that is adjacent to the intermediate display region, and second degradation information for a second edge region within the second display region that is adjacent to the intermediate display region,
an edge information extractor that extracts, in a first partial driving mode in which the first display region is driven, first edge information for the first edge region from first partial image data for the first display region, and that extracts, in a second partial driving mode in which the second display region is driven, second edge information for the second edge region from second partial image data for the second display region; and
a gradation image generator that generates, in the first partial driving mode, first gradation data for the intermediate display region based on the first edge information and the second degradation information, and that generates, in the second partial driving mode, second gradation data for the intermediate display region based on the first degradation information and the second edge information,
wherein the first degradation information is updated every L frames by calculating an average of accumulated gray values represented by the first degradation information and current gray values represented by current image data for the first edge region, where L is an integer greater than 0, and
wherein the second degradation information is updated every L frames by calculating an average of accumulated gray values represented by the second degradation information and current gray values represented by current image data for the second edge region.

2. The display device of claim 1, wherein the display panel is an out-foldable display panel, and
wherein the intermediate display region is a foldable region of the out-foldable display panel.

3. The display device of claim 2, wherein the display device operates in the first partial driving mode when the out-foldable display panel is folded such that the first display region is located at a front side and the second display region is located at a back side, and
wherein the display device operates in the second partial driving mode when the out-foldable display panel is folded such that the second display region is located at the front side and the first display region is located at the back side.

4. The display device of claim 1,
wherein the gradation image generator generates the first gradation data such that the first gradation data continuously change from a gray value represented by the first edge information to a gray value represented by the second degradation information along a first direction from the first display region to the second display region, and
wherein the gradation image generator generates the second gradation data such that the second gradation data continuously change from a gray value represented by the first degradation information to a gray value represented by the second edge information along the first direction.

5. The display device of claim 1, wherein the gradation image generator calculates a first edge block gray value by calculating an average of N consecutive gray values represented by the first edge information, where N is an integer greater than 1, calculates a second degradation block gray value by calculating an average of N consecutive gray values represented by the second degradation information, and generates the first gradation data such that the first gradation data continuously change from the first edge block gray value to the second degradation block gray value along a first direction from the first display region to the second display region, and
wherein the gradation image generator calculates a first degradation block gray value by calculating an average of N consecutive gray values represented by the first degradation information, calculates a second edge block gray value by calculating an average of N consecutive gray values represented by the second edge information, and generates the second gradation data such that the second gradation data continuously change from the first degradation block gray value to the second edge block gray value along the first direction.

6. The display device of claim 1, wherein the gradation image generator calculates a first edge weighted moving average by calculating a weighted moving average of N consecutive gray values represented by the first edge information, where N is an integer greater than 1, calculates a second degradation weighted moving average by calculating a weighted moving average of N consecutive gray values represented by the second degradation information, and generates the first gradation data such that the first gradation data continuously change from the first edge weighted moving average to the second degradation weighted moving average along a first direction from the first display region to the second display region, and
wherein the gradation image generator calculates a first degradation weighted moving average by calculating a weighted moving average of N consecutive gray values represented by the first degradation information, calculates a second edge weighted moving average by calculating a weighted moving average of N consecutive gray values represented by the second edge information, and generates the second gradation data such that the second gradation data continuously change from the first degradation weighted moving average to the second edge weighted moving average along the first direction.

7. The display device of claim 1, wherein the first edge region includes first M pixel lines, where M is an integer greater than 0, and the second edge region includes second M pixel lines,
wherein the edge information extractor generates the first edge information by calculating an average of M gray levels represented by the first partial image data for the first M pixel lines, and
wherein the edge information extractor generates the second edge information by calculating an average of M gray levels represented by the second partial image data for the second M pixel lines.

8. The display device of claim 1, wherein the first edge region includes first M pixel lines, where M is an integer greater than 0, and the second edge region includes second M pixel lines,
wherein the edge information extractor generates the first edge information by extracting a maximum of M gray levels represented by the first partial image data for the first M pixel lines, and
wherein the edge information extractor generates the second edge information by extracting a maximum of M gray levels represented by the second partial image data for the second M pixel lines.

9. The display device of claim 1, wherein the first edge region includes first M pixel lines, where M is an integer greater than 0, and the second edge region includes second M pixel lines,
wherein the edge information extractor generates the first edge information by calculating a weighted average of M gray levels represented by the first partial image data for the first M pixel lines with a weight that decreases as a distance from the intermediate display region increases, and
wherein the edge information extractor generates the second edge information by calculating a weighted average of M gray levels represented by the second partial image data for the second M pixel lines with a weight that decreases as a distance from the intermediate display region increases.

10. The display device of claim 1, wherein each of the first degradation information and the second degradation information includes K accumulated gray values, where K is an integer greater than 0, and
wherein one of the K accumulated gray values of each of the first degradation information and the second degradation information is updated every L frames, where L is an integer greater than 0.

11. The display device of claim 1, wherein each pixel of the display panel includes a red sub-pixel, a green sub-pixel and a blue sub-pixel, and
wherein the gradation image generator generates, in the first partial driving mode, as the first gradation data, first red gradation data for the red sub-pixel, first green gradation data for the green sub-pixel and first blue gradation data for the blue sub-pixel, and generates, in the second partial driving mode, as the second gradation data second red gradation data for the red sub-pixel, second green gradation data for the green sub-pixel and second blue gradation data for the blue sub-pixel.

12. The display device of claim 1, wherein each pixel of the display panel includes a red sub-pixel, a green sub-pixel and a blue sub-pixel, and
wherein the gradation image generator generates, in the first partial driving mode, first red gradation data for the red sub-pixel, first green gradation data for the green sub-pixel and first blue gradation data for the blue sub-pixel in a same pixel, wherein the first red gradation data, the first green gradation data, and the first blue gradation data represent the same gray value for, respectively the red sub-pixel, the green sub-pixel and the blue sub-pixel, and generates, in the second partial driving mode, second red gradation data for the red sub-pixel, second green gradation data for the green sub-pixel and second blue gradation data for the blue sub-pixel in the same pixel, wherein the second red gradation data, the second green gradation data, and the second blue gradation data represent the same gray value for, respectively the red sub-pixel, the green sub-pixel and the blue sub-pixel.

13. The display device of claim 1, further comprising:
a scan driver that includes first stages that sequentially transmit first scan signals to the first display region in response to a first scan start signal, second stages that sequentially transmit second scan signals to the intermediate display region in response to a second scan start signal, and third stages that sequentially transmit third scan signals to the second display region in response to a third scan start signal.

14. The display device of claim 1, further comprising:
a data driver that transmits data signals to the display panel,
wherein, in the first partial driving mode, the data driver transmits the data signals that correspond to the first partial image data to the first display region and the data signals that correspond to the first gradation data to the intermediate display region such that an image that corresponds to the first partial image data is displayed in the first display region and a first gradation image that corresponds to the first gradation data is displayed in the intermediate display region, and
wherein, in the second partial driving mode, the data driver transmits the data signals that correspond to the second partial image data to the second display region and the data signals that correspond to the second gradation data to the intermediate display region such that an image that corresponds to the second partial image data is displayed in the second display region and a second gradation image that corresponds to the second gradation data is displayed in the intermediate display region.

15. The display device of claim 1, wherein, in a third partial driving mode in which the first display region and the second display region are driven, the gradation image generator generates third gradation data for the intermediate display region based on the first edge information and the second edge information.

16. A method of operating a display device that includes a display panel that includes a first display region, a second display region, and an intermediate display region located between the first display region and the second display region, the method comprising:
storing first degradation information for a first edge region within the first display region that is adjacent to the intermediate display region;
storing second degradation information for a second edge region within the second display region that is adjacent to the intermediate display region;
extracting first edge information for the first edge region from first partial image data for the first display region in a first partial driving mode in which the first display region is driven;
extracting second edge information for the second edge region from second partial image data for the second display region in a second partial driving mode in which the second display region is driven;
generating, in the first partial driving mode, first gradation data for the intermediate display region based on the first edge information and the second degradation information;

generating, in the second partial driving mode, second gradation data for the intermediate display region based on the first degradation information and the second edge information;

driving, in the first partial driving mode, the first display region and the intermediate display region based on the first partial image data and the first gradation data; and driving, in the second partial driving mode, the second display region and the intermediate display region based on the second partial image data and the second gradation data, wherein the first degradation information is updated every L frames by calculating an average of accumulated gray values represented by the first degradation information and current gray values represented by current image data for the first edge region, where L is an integer greater than 0, and wherein the second degradation information is updated every L frames by calculating an average of accumulated gray values represented by the second degradation information and current gray values represented by current image data for the second edge region.

17. The method of claim 16,
wherein generating the first gradation data includes:
   generating the first gradation data such that the first gradation data continuously change from a gray value represented by the first edge information to a gray value represented by the second degradation information along a first direction from the first display region to the second display region, and
wherein generating the second gradation data includes:
   generating the second gradation data such that the second gradation data continuously change from a gray value represented by the first degradation information to a gray value represented by the second edge information along the first direction.

18. The method of claim 16,
wherein generating the first gradation data includes:
   calculating a first edge block gray value by calculating an average of N consecutive gray values represented by the first edge information, where N is an integer greater than 1;
   calculating a second degradation block gray value by calculating an average of N consecutive gray values represented by the second degradation information; and
   generating the first gradation data such that the first gradation data continuously change from the first edge block gray value to the second degradation block gray value along a first direction from the first display region to the second display region, and
wherein generating the second gradation data includes:
   calculating a first degradation block gray value by calculating an average of N consecutive gray values represented by the first degradation information;
   calculating a second edge block gray value by calculating an average of N consecutive gray values represented by the second edge information; and
   generating the second gradation data such that the second gradation data continuously change from the first degradation block gray value to the second edge block gray value along the first direction.

19. The method of claim 16, wherein generating the first gradation data includes:
   calculating a first edge weighted moving average by calculating a weighted moving average of N consecutive gray values represented by the first edge information, where N is an integer greater than 1;
   calculating a second degradation weighted moving average by calculating a weighted moving average of N consecutive gray values represented by the second degradation information; and
generating the first gradation data such that the first gradation data continuously change from the first edge weighted moving average to the second degradation weighted moving average along a first direction from the first display region to the second display region, and
wherein generating the second gradation data includes:
   calculating a first degradation weighted moving average by calculating a weighted moving average of N consecutive gray values represented by the first degradation information;
   calculating a second edge weighted moving average by calculating a weighted moving average of N consecutive gray values represented by the second edge information; and
   generating the second gradation data such that the second gradation data continuously change from the first degradation weighted moving average to the second edge weighted moving average along the first direction.

* * * * *